United States Patent
Hayasaki

(10) Patent No.: US 8,184,912 B2
(45) Date of Patent: *May 22, 2012

(54) IMAGE PROCESSING APPARATUS, IMAGE FORMING APPARATUS, IMAGE PROCESSING SYSTEM, AND IMAGE PROCESSING METHOD

(75) Inventor: Makoto Hayasaki, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 1009 days.

This patent is subject to a terminal disclaimer.

(21) Appl. No.: 12/133,989

(22) Filed: Jun. 5, 2008

(65) Prior Publication Data

US 2008/0304751 A1   Dec. 11, 2008

(30) Foreign Application Priority Data

Jun. 6, 2007 (JP) ................................ 2007-150969
Apr. 21, 2008 (JP) ................................ 2008-110739

(51) Int. Cl.
*G06K 9/62* (2006.01)

(52) U.S. Cl. ........ 382/216; 382/181; 382/190; 382/201; 382/209; 382/218

(58) Field of Classification Search ........................ None
See application file for complete search history.

(56) References Cited

U.S. PATENT DOCUMENTS

| | | | |
|---|---|---|---|
| 5,799,115 A | 8/1998 | Asano et al. | |
| 5,995,652 A * | 11/1999 | Chiu et al. | 382/159 |
| 6,178,270 B1 | 1/2001 | Taylor et al. | |
| 7,039,229 B2 * | 5/2006 | Lin et al. | 382/165 |
| 7,155,051 B2 * | 12/2006 | Murakawa | 382/135 |
| 2004/0090641 A1 * | 5/2004 | Namikata | 358/1.9 |
| 2005/0147305 A1 * | 7/2005 | Ikeda et al. | 382/209 |
| 2008/0177764 A1 * | 7/2008 | Kise et al. | 707/100 |

FOREIGN PATENT DOCUMENTS

JP   8-255236 A   10/1996
WO   WO-2006/092957 A1   9/2006

OTHER PUBLICATIONS

US Office Action issued in co-pending U.S. Appl. No. 12/133,940 dated Oct. 25, 2011.

* cited by examiner

*Primary Examiner* — Jason M Repko
*Assistant Examiner* — David Perlman
(74) *Attorney, Agent, or Firm* — Birch, Stewart, Kolasch & Birch, LLC

(57) ABSTRACT

There are provided: a pattern detection process section for extracting a partial image made of pixels including a target pixel from input image data; a rotated image generating section for generating a self-rotated image by rotating the partial image; and a matching test determination section for determining whether an image pattern included in the partial image matches an image pattern included in the self-rotated image. When it is determined that matching exists, a target pixel in the partial image or a block made of pixels including the target pixel is regarded as a feature point. Consequently, even when image data has been read while skewed with respect to a predetermined positioning angle of a reading position of an image reading apparatus or image data has been subjected to enlarging, reducing etc., a feature point properly specifying the image data can be extracted regardless of skew, enlarging, reducing etc.

13 Claims, 26 Drawing Sheets

| HASH VALUE | INDEX INDICATIVE OF DOCUMENT |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 11 (b)

| HASH VALUE | INDEX INDICATIVE OF DOCUMENT |
|---|---|
| H1 | ID1、ID1 |
| H2 | ID1 |
| H3 | ID1、ID2 |
| H4 | ID1 |
| H6 | ID1、ID2 |
| ⋮ | ⋮ |

ORIGINAL IMAGE

IMAGE ROTATED BY 90-DEGREES

H11

H12

H13

H14

H21

H22

H23

H24

PATTERN A

PATTERN B

PATTERN C

COLOR SIGNAL

R CHANNEL SIGNAL

G CHANNEL SIGNAL

B CHANNEL SIGNAL

IMAGE PROCESSING APPARATUS, IMAGE FORMING APPARATUS, IMAGE PROCESSING SYSTEM, AND IMAGE PROCESSING METHOD

This Nonprovisional application claims priority under 35 U.S.C. §119(a) on Patent Application No. 2007-150969 filed in Japan on Jun. 6, 2007 and Patent Application No. 2008-110739 filed in Japan on Apr. 21, 2008, the entire contents of which are hereby incorporated by reference.

FIELD OF THE INVENTION

The present invention relates to an image processing apparatus, an image forming apparatus, and an image processing system, each including a features calculation section for extracting features of image data, and to an image processing method with use of the features calculation section.

BACKGROUND OF THE INVENTION

There have been proposed various techniques for comparing (i) input image data obtained by a scanner reading a document image with (ii) a preliminarily stored image so as to determine a similarity between the input image data and the preliminarily stored image.

Examples of the method for determining a similarity include: a method in which a text image is extracted, a keyword is extracted from the text image with OCR (Optical Character Reader) so as to carry out matching with the keyword; and a method in which features of a ruled line included in an image are extracted so as to carry out matching with the features.

Further, Patent Document 1 (Japanese Unexamined Patent Publication No. Tokukaihei 8-255236 (published on Oct. 1, 1996)) discloses a technique in which texts, frames for text strings, frames etc. are recognized from an input image and matching is performed with respect to each frame based on frame information, thereby performing a format recognition of a ruled line image etc.

Further, Patent Document 2 (International Publication No. WO 2006/092957A1, pamphlet (published on Sep. 8, 2006) discloses a technique in which a centroid of a word in an English document, a centroid of a connected component of a black pixel, a closed space of a kanji character, a specific portion repeatedly appearing in an image etc. are extracted as feature points, a set of local feature points are determined out of the extracted feature points, a partial set of feature points is selected out of the determined set of local feature points, invariants relative to geometric transformation each as a value characterizing the selected partial set are calculated in accordance with plural combinations of feature points in the partial set, the calculated invariants are regarded as features, and a document matching is performed in accordance with the features.

However, the techniques of Patent Documents 1 and 2 have a problem that in a case where input image data has been read while being skewed with respect to a predetermined positioning angle of a reading position of an image reading apparatus or input image data is data having been subjected to a process such as enlarging and reducing, features cannot be extracted with high accuracy.

For example, in the technique of Patent Document 1, the results of recognition of texts, frames for text strings, frames etc. vary according to the influences of the skew, the enlarging, the reducing etc., and consequently it is impossible to perform a format recognition with high accuracy.

Further, in the technique of Patent Document 2, the results of extracting a centroid of a word in an English document, a centroid of a connected component of a black pixel, a closed space of a kanji character, a specific portion repeatedly appearing in an image etc. vary according to the influences of the skew, the enlarging, the reducing etc., and consequently accuracy in document matching drops.

In a case where a feature point is extracted from an image including a handwritten text (e.g. an image of a document which was printed in a predetermined font and on which a handwritten note is written), the techniques of Patent Documents 1 and 2 are particularly likely to make an erroneous determination, because the techniques has lower determination accuracy due to the skew, the enlarging, the reducing etc. as well as because a handwritten text is greatly different from the shape of a font stored in an image processing apparatus.

Further, the technique of Patent Document 2 has a problem that, when a feature point is extracted, binarization of image data and labeling of the image data are performed before a centroid of a word in an English document, a centroid of a connected component of a black pixel, a closed space of a kanji character, a specific portion repeatedly appearing in an image etc. are extracted, which complicates the process and requires a larger circuit configuration.

Further, in the case of the technique in Patent Document 2 where a centroid of a word and a centroid of a connected component of a black pixel are extracted as feature points, when input image data is data of a document having a large part of a table and a small part of texts, less number of feature points are extracted, which drops accuracy in matching image data.

SUMMARY OF THE INVENTION

The present invention was made in view of the foregoing problems. An object of the present invention is to extract from image data a feature point that allows suitably specifying the image data, the image data having been read while being skewed with respect to a predetermined positioning angle of a reading position of an image reading apparatus, or having been subjected to a process such as enlarging and reducing.

In order to solve the foregoing problems, the image processing apparatus of the present invention includes: a feature point detection section for detecting feature points included in input image data; and a features calculation section for calculating features of the input image data in accordance with relative positions of the feature points detected by the feature point detection section, the feature point detection section including: a partial image extraction section for extracting, from the input image data, a partial image made of a plurality of pixels including a target pixel; a rotated image generating section for generating a self-rotated image by rotating the partial image by a predetermined angle; a matching test determination section for determining whether an image pattern included in the partial image matches an image pattern included in the self-rotated image or not, when the partial image is caused to overlap the self-rotated image; and a detection section for detecting, as each of the feature points, (a) a target pixel in the partial image including the image pattern determined by the matching test determination section as matching the image pattern included in the self-rotated image, or (b) a block made of a plurality of pixels including the target pixel.

With the arrangement, the partial image extraction section extracts, from the input image data, a partial image made of a plurality of pixels including a target pixel, the rotated image generating section generates a self-rotated image by rotating the partial image by a predetermined angle, the matching test determination section determines whether an image pattern included in the partial image matches an image pattern included in the self-rotated image or not when the partial image is caused to overlap the self-rotated image, and the detection section detects, as each of the feature points, (a) a target pixel in the partial image including the image pattern determined by the matching test determination section as matching the image pattern included in the self-rotated image, or (b) a block made of a plurality of pixels including the target pixel.

Consequently, even when input image data has been read while being skewed with respect to a predetermined positioning angle of a reading position of an image reading apparatus, or even when input image data has been subjected to a process such as enlarging and reducing, it is possible to detect, as a feature point, a target pixel of a partial image including an image pattern that is not or little influenced by the skew, the enlarging, the reducing, etc. or a block including the target pixel. Therefore, by calculating features of input image data in accordance with relative positions of the feature points, it is possible to obtain features that allows accurately specifying the input image data regardless of the skew, the enlarging, the reducing, etc.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 11($a$) and 11($b$) are explanatory drawings each illustrating an example of a hash value stored in a hash table and an index indicative of input image data.

FIG. 17($b$) is an explanatory drawing illustrating an example of a self-rotated image obtained by rotating the partial image in FIG. 17($a$).

FIGS. 27($b$) to 27($d$) are explanatory drawings illustrating multivalent image data of R channel, G channel, and B channel, respectively, each corresponding to the image data in FIG. 27($a$).

DESCRIPTION OF THE EMBODIMENTS

Embodiment 1

An embodiment of the present invention is explained below. Explained in this embodiment is a case where the present invention is applied to a digital color multi-function printer (MFP).

(1-1. Arrangement of Digital Color Multi-Function Printer 1)

Figure 2:
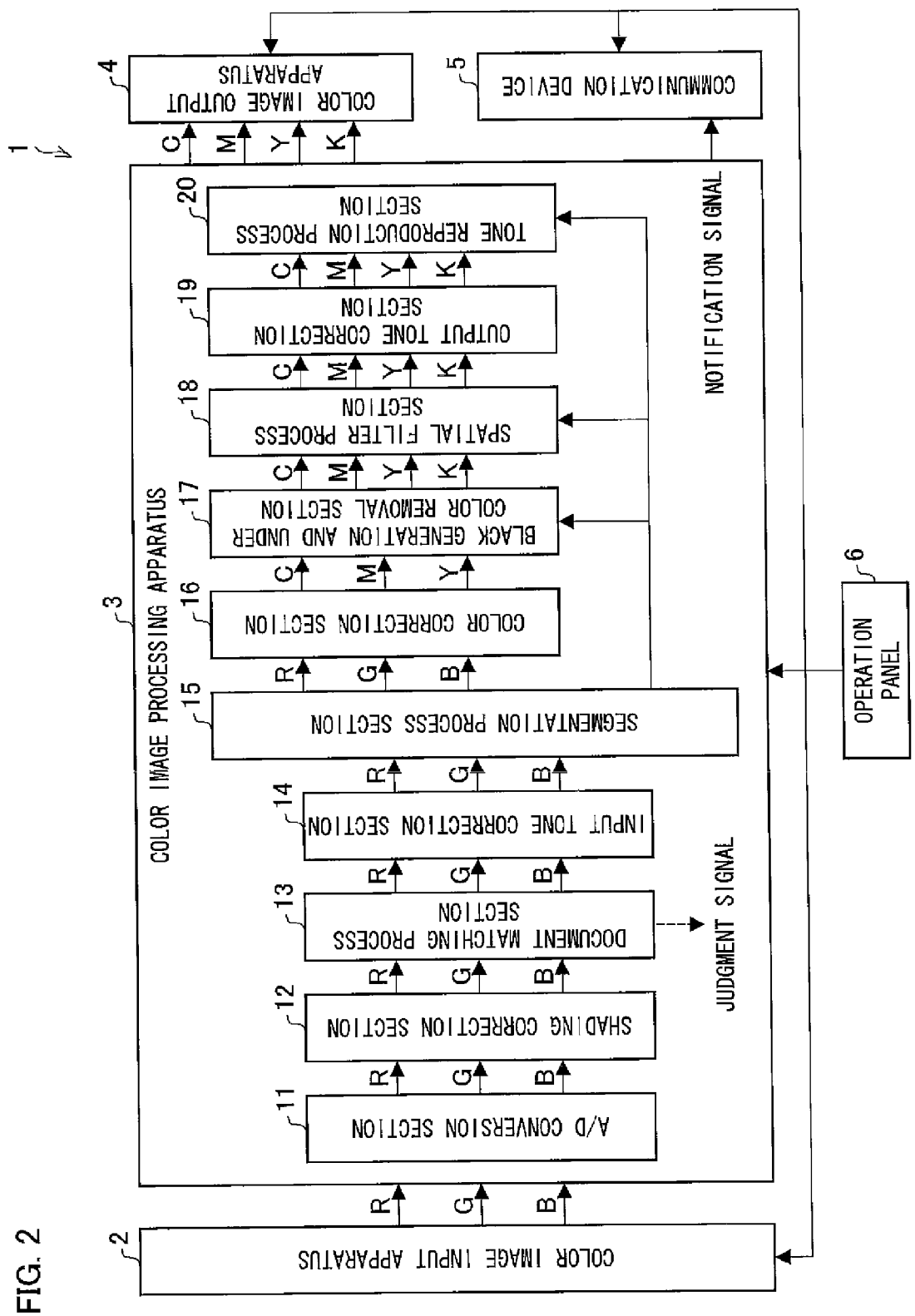
FIG. 2 is a block diagram schematically illustrating an arrangement of an image processing apparatus in accordance with an embodiment of the present invention.

FIG. 2 is a block diagram schematically illustrating an arrangement of a digital color multi-function printer (image processing apparatus, image forming apparatus, image reading apparatus) 1 according to the present embodiment. The digital color multi-function printer 1 has a copying function, a printing function, a facsimile-transmission function, a scanning function, a scan-to-E-mail function, and the like.

As illustrated in FIG. 2, the digital color multi-function printer 1 includes a color image input apparatus 2, a color image processing apparatus 3, a color image output apparatus 4, a communication device 5, and an operation panel 6.

The color image input apparatus (image reading apparatus) 2 is, for example, composed of a scanner (not shown) including a CCD (Charge Coupled Device) for converting optical information into an electric signal. The color image input apparatus 2 reads an optical image reflected from an original document as RGB (R: Red, G: Green, B: Blue) analog signals and supplies the RGB analog signals to the color image processing apparatus 3.

The color image processing apparatus 3 includes an A/D converter 11, a shading correction section 12, a document matching process section 13, an input tone correction section 14, a segmentation process section 15, a color correction section 16, a black generation and under color removal section 17, a spatial filter process section 18, an output tone correction section 19, and a tone reproduction process section 20. The analog signals read by the color image input apparatus 2 are transmitted to the A/D converter 11, the shading correction section 12, the document matching process section 13, the input tone correction section 14, the segmentation process section 15, the color correction section 16, the black generation and under color removal section 17, the spatial filter process section 18, the output tone correction section 19, and the tone reproduction process section 20 in this order in the color image processing apparatus 3. Ultimately, the analog signals are outputted to the color image output apparatus 4 as CMYK digital color signals.

The A/D (Analog/Digital) converter 11 converts the RGB analog signals into RGB digital signals.

The shading correction section 12 removes various distortions produced in an illumination system, an image focusing system, and an image sensing system of the color image input apparatus 2 from the RGB digital signals transmitted from the A/D converter 11. Moreover, the shading correction section 12 adjusts color balance of the RGB digital signals and converts each signal into a signal such as a density signal which can be processed easily by an image processing system used in the color image processing apparatus 3.

The document matching process section 13 extracts a feature point from input image data, and calculates features in accordance with the extracted feature point. Further, the document matching process section 13 causes the calculated features to be stored in a later-mentioned hash table in such a manner that the features are related to image data. Further, the document matching process section 13 compares the calculated features with features of a reference image stored in the hash table so as to determine a similarity between an input image and a reference image. Further, the document matching process section 13 outputs the inputted RGB signals to the subsequent input tone correction section 14 without any modification. Note that, the document matching process section 13 will be detailed later.

The input tone correction section 14 removes background color (density component of the background: background density) from the RGB signals whose various distortions have been removed by the shading correction section 12, and adjusts image quality such as contrast.

The segmentation process section 15 separates each pixel of an input image into either one of a text region, a halftone dot region, or a photograph (continuous tone) region, according to the RGB signals. On the basis of a result of the separation, the segmentation process section 15 outputs a segmentation class signal, indicating which region a pixel of the input image belongs to, to the color correction section 16, the black generation and under color removal section 17, the spatial filter process section 18, and the tone reproduction process section 20. The segmentation process section 15 also outputs the input signal as received from the input tone correction section 14 to the subsequent color correction section 16 without any modification.

The color correction section 16 removes color impurity on the basis of spectral characteristics of CMY (C: Cyan, M: Magenta, and Y: Yellow) color materials including an unnecessarily absorption component, in order to realize a faithful color reproduction.

The black generation and under color removal section 17 performs (i) black generation processing for generating a black (K) signal from three color (CMY) signals after the color correction processing and (ii) generation processing of new CMY signals by removing the K signal obtained by the black generation processing from the original CMY signals. As a result, the three CMY signals are converted into four CMYK signals.

With the use of a digital filter, the spatial filter process section 18 performs a spatial filter processing on the basis of a segmentation class signal, with respect to the image data which is received in the form of the CMYK signals from the black generation and under color removal section 17. In the spatial filter processing, the spatial filter process section 18 corrects a spatial frequency characteristic, so as to reduce blur or granularity deterioration in an output image. The tone reproduction process section 20, as with the spatial filter process section 18, performs a predetermined process with respect to the image data in the form of the CMYK signals, on the basis of the segmentation class signal.

For example, in the region separated into a text region by the segmentation process section 15, the spatial filter process section 18 strongly emphasizes a high frequency component in an edge enhancement process of a spatial filter process, in order to improve reproducibility of a black text or a color text especially. Concurrently, the tone reproduction process section 20 selects either binary processing or multi-level dithering on a high-resolution screen suitable for reproducing the high frequency component.

In the region separated into a halftone dot region by the segmentation process section 15, the spatial filter process section 18 performs a low pass filter processing for removing an input halftone dot component. The output tone correction section 19 performs the output tone correction processing in which a signal such as a density signal is converted into a halftone dot area rate that is characteristics of the color image output apparatus 4. Subsequently, the tone reproduction process section 20 performs the tone reproduction processing (half tone generation) so that, ultimately, an image is segmented into pixels and each tone of the pixels can be reproduced. In the region separated into a photograph region by the segmentation process section 15, the binary processing or the multi-level dithering processing is performed on a screen suitable for tone reproduction.

The image data which has been subjected to each of the processing mentioned above is temporarily stored in a storage device (not shown). The image data is read from the storage device at a predetermined timing and supplied to the color image output apparatus 4.

The color image output apparatus 4 outputs the image data supplied from the color image processing apparatus 3 to a recording medium such as paper. The color image output apparatus 4 is not particularly limited and may be a color image output apparatus which uses an electrophotographic method or an ink-jet method.

The communication device 5 is composed of a modem or a network card for example. The communication device 5 communicates with other apparatus connected to a network (e.g., a personal computer, a server, other digital multi-function printer, a facsimile and the like) via a network card, a LAN cable, and the like.

Note that, in case of transmitting image data, the communication device 5 carries out a transmission procedure to secure a state where transmission can be performed, and then reads out, from a memory, the image data compressed in a predetermined format (image data scanned by a scanner) and carries out necessary processing such as change of the encoding format so as to sequentially transmit the image data via a communication line.

Further, in case of receiving image data, the communication device 5 carries out a communication procedure and receives the image data from a transmission end so as to input the image data to the color image processing apparatus 3. The received image data is subjected to a predetermined process such as a decoding process, a rotation process, a resolution conversion process, output tone correction, and a tone reproduction process by the color image processing apparatus 3, and the image data thus processed is outputted by the color image output apparatus 4. Note that, the present invention may be arranged so that the received image data is stored in a storage device (not shown) and the stored image data is read out by the color image processing apparatus 3 as necessary so as to be subjected to the aforementioned processing.

The operation panel 6 includes, for example, a display section (not shown) such as a liquid crystal display and setting buttons (not shown). The operation panel 6 causes the display section to display information corresponding to an instruction of a main control section (not shown) of the digital color multifunction printer 1 and transmits information, inputted by the user with use of the setting buttons, to the main control section. The user can input, via the operation panel 6, a processing request (e.g., a processing mode (copy, printing, transmission, editing and the like), the number of images to be processed (the number of images to be copied, the number of images to be printed), a destination of input image data, and the like) with respect to the image data. The main control section is composed of a CPU (Central Processing Unit) and the like for example. In accordance with a program or various data stored in a ROM (not shown) or the like and information which is entered via the operation panel 6, the main control section controls each operation of each section of the digital color multi-function printer 1.

(1-2 Document Matching Process Section 13)

Next explained is the document matching process section 13 in detail. The document matching process section 13 according to the present embodiment extracts plural feature points from the input image data, determines a set of local feature points relative to each of the extracted feature points, selects a partial set of feature points out of the determined set of local feature points, calculates invariants each of which is relative to geometric transformation as a value characterizing the selected partial set in accordance with plural combinations of feature points in the partial set, calculates a hash value (features) by combining the calculated invariants, and votes for a reference image corresponding to the hash value, thereby retrieving a reference image similar to the input image data and carrying out a similarity determination process (whether there is any similarity or not) with respect to the reference image. Further, it is possible to cause the calculated hash value to be stored in the hash table in such a manner that the calculated hash value is related to the image from which the hash value was extracted.

Figure 1:
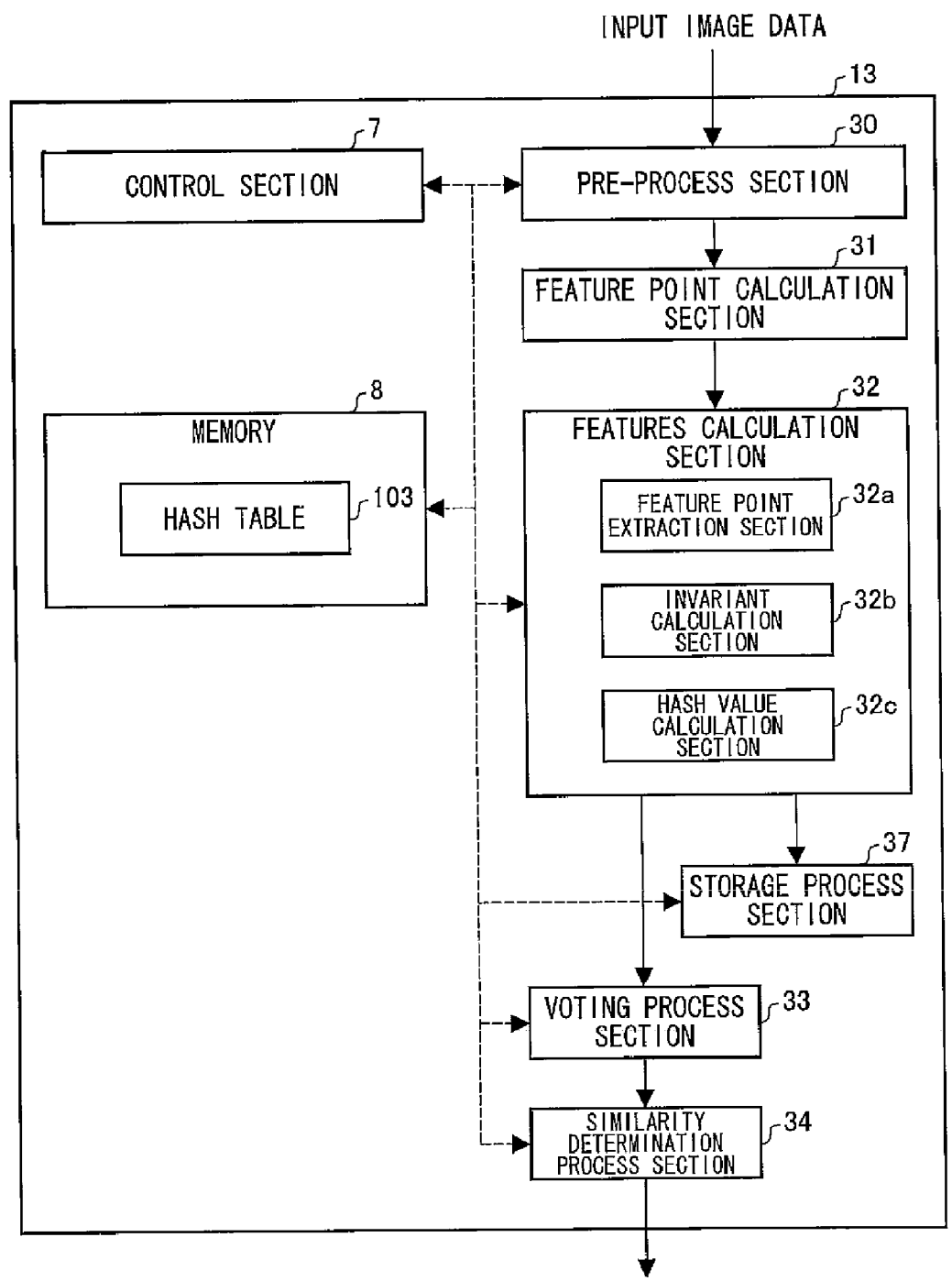
FIG. 1 is a block diagram schematically illustrating an arrangement of a document matching process section included in an image processing apparatus in accordance with an embodiment of the present invention.

FIG. 1 is a block diagram schematically illustrating an arrangement of the document matching process section 13. As illustrated in FIG. 1, the document matching process section 13 includes a pre-process section 30, a feature point calculation section (feature point extracting section) 31, a features (feature vectors) calculation section 32, a voting process section 33, a similarity determination process section 34, a storage process section 37, a control section 7, and a memory 8.

The control section 7 controls operations of the sections of the document matching process section 13. Note that, the control section 7 may be provided in the main control section for controlling operations of the sections of the digital color multi-function printer 1 or may be provided separately from the main control section so as to cooperate with the main control section in controlling operations of the document matching process section 13.

Further, in the memory 8, there is provided a hash table 103 for storing an index for specifying a reference image and features extracted from the reference image in such a manner that the index and the features are related to each other. Further, in the memory 8, there are provided not only the hash table 103 but also a storage section in which various data used in processes of the sections of the document matching process section 13 and results of the processes etc. are stored. The hash table 103 will be detailed later.

Figures 3, 4:
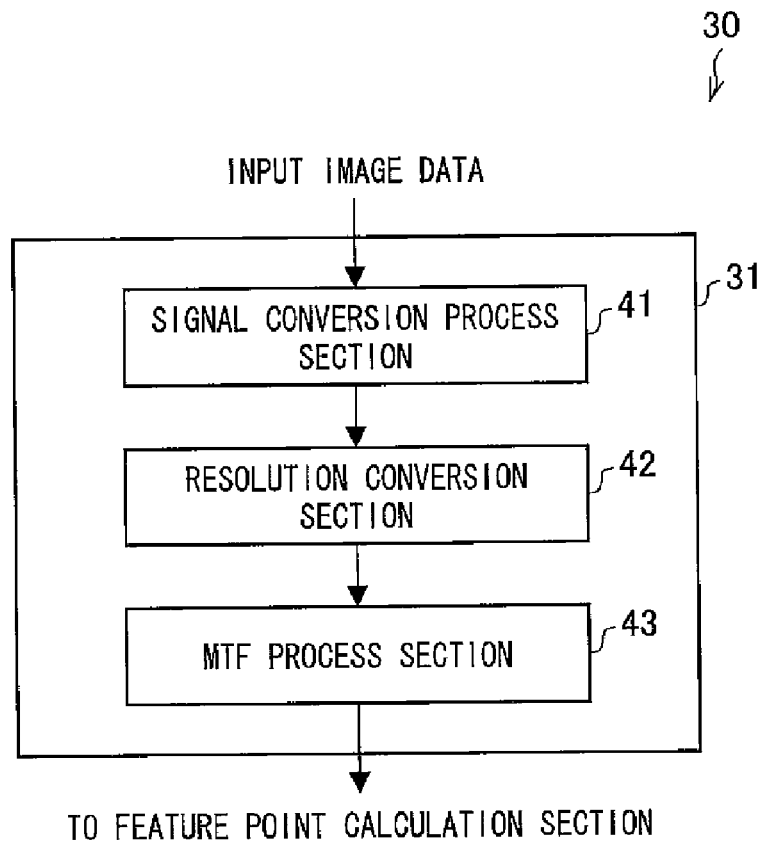
FIG. 3 is a block diagram schematically illustrating a pre-process section included in the document matching process section in FIG. 1.
FIG. 4 is an explanatory drawing illustrating an example of filter coefficients for a mixing filter included in an MTF process section of the pre-process section in FIG. 3.

FIG. 3 is a block diagram schematically illustrating an arrangement of the pre-process section 30. As illustrated in FIG. 3, the pre-process section 30 includes a signal conversion process section (achromatizing process section) 41, a resolution conversion section 42, and an MTF process section 43.

In case where image data (RGB signals) inputted from the shading correction section 12 is a color image, the signal conversion process section 41 achromatizes the image data and converts the achromatized image data into a lightness signal or a luminance signal.

For example, the signal conversion process section 41 converts the RGB signals into a luminance signal Y in accordance with the following expression (1).

$$Yi = 0.30Ri + 0.59Gi + 0.11Bi \tag{1}$$

"Y" refers to a luminance signal of each pixel, and each of R, G, and B is a color component of the RGB signals, and "i" subsequently added to "Y", "R", "G", and "B" represents a value given to each pixel (i is an integer not less than 1).

Alternatively, the RGB signals may be converted into CIE1976L*a*b* signal (CIE: Commission International de l'Eclairage, L*: lightness, a*, b*: chromaticity).

The resolution conversion section 42 scales up/down the input image data. For example, in case where the input image data is optically scaled up/down by the image input apparatus 2, the resolution conversion section 42 scales up/down the input image data again so as to have a predetermined resolution. Further, in order to reduce processes carried out by the subsequent process sections, the resolution conversion section 42 may convert resolution so as to make the resolution lower than a resolution in being scanned by the image input apparatus 2 at an equal scale factor (for example, image data scanned at 600 dpi (dot per inch) is converted into data of 300 dpi or a similar operation is carried out).

The MTF (modulation transfer function) process section 43 is used to cover (adjust) unevenness of spatial frequency characteristics among a plurality of color image input apparatuses 2. In the image signal outputted from the CCD, MTF deterioration occurs due to an optical component such as a lens or a mirror, an aperture in a light receiving surface of the CCD, transfer efficiency or afterimage, storage effect or scanning unevenness caused by physical scanning, and a similar cause. The MFT deterioration causes the scanned image to blur. The MTF process section 43 carries out an appropriate filtering process (emphasizing process) so as to recover the blur caused by the MTF deterioration. Further, the MTF process section 43 is used also to suppress a high frequency component that is unnecessary in a later-mentioned feature point extracting process. That is, a mixing filter (not shown) is used to carry out an emphasizing process and a smoothing process. Note that, FIG. 4 illustrates an example of a filter coefficient of the mixing filter.

The arrangement of the pre-process section 30 is not limited to the above arrangement. For example, the pre-process section 30 may be arranged so that in addition to the above processes, or instead of a part of or all of the above processes, there are performed a differentiation process for extracting an edge component, a noise reduction process with use of an unsharp mask, a binarization process for reducing the amount of processed data.

Figure 5:
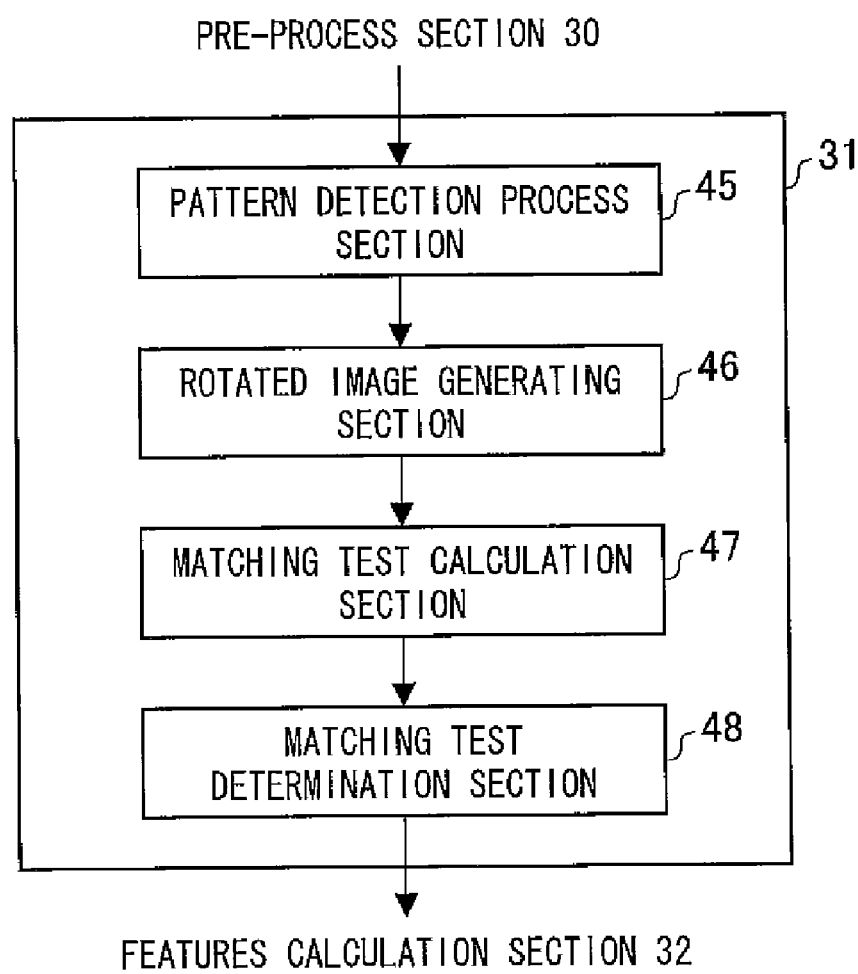
FIG. 5 is a block diagram schematically illustrating an arrangement of a feature point calculation section (feature point detection section) included in the document matching process section in FIG. 1.

FIG. 5 is a block diagram schematically illustrating an arrangement of the feature point calculation section 31. As illustrated in FIG. 5, the feature point calculation section 31 includes a pattern detection process section 45, a rotated image generating section 46, a matching test calculation section 47, and a matching test determination section (detection section) 48.

The pattern detection process section 45 extracts, out of an input image, a partial image having M×M pixels (M is an integer of 3 or more) centering a target pixel, and performs a pattern detection process in which it is judged whether an effective pattern exists or not in the partial image. Further, the pattern detection process section 45 performs the pattern detection process with respect to each pixel by serially raster-scanning the target pixel with respect to each pixel. In a case where the number of pixels included in a partial image does not reach M×M at the end of the image, the end of the image may be folded and copied in order to compensate a shortage of pixels. Here, a partial image has M×M pixels. Alternatively, a partial image to be extracted may have M×N pixels (N is an integer of 3 or more and M≠N). However, when a partial image has M×M pixels, the number of pixels used for determination can be identical with the number of pixels in a partial image, even when a later-mentioned self-rotation angle is other than 180° C. Therefore, it is preferable that a partial image includes M×M pixels.

The following details the pattern detection process. In the present embodiment, the pattern detection process section 45 calculates a variance value busy indicative of busyness of image data in accordance with the following equation. In the equation (1), N represents the number of pixels in a partial image, I represents a signal value of each pixel, and i represents a value for specifying each pixel (i is an integer from 1 to N).

$$\text{Busy} = N \sum_{i=1}^{N} (I_i \times I_i) - \left(\sum_{i=1}^{N} I_i\right) \times \left(\sum_{i=1}^{N} I_i\right) \quad (1)$$

The pattern detection process section 45 compares the variance value busy with a predetermined threshold value TH1 to find a magnitude relationship between the variance value busy and the threshold value TH1, thereby judging whether a pattern exists or not. For example, when busy≧TH1, the pattern detection process section 45 judges that an effective pattern exists, and when busy<TH1, the pattern detection process section 45 judges that an effective pattern does not exist. The threshold value TH1 may be set suitably so that a pattern is extracted suitably. Here, an explanation was made as to a case where the variance value busy was used. Alternatively, for example, an index other than the variance value for indicating busyness may be used to judge whether an effective pattern exists or not.

The rotated image generating section 46 generates a self-rotated image by rotating the partial image judged as having a pattern by the pattern detection process section 45, in such a manner that the partial image is rotated by a predetermined angle (predetermined self-rotation angle) R° while centering a central coordinate (target pixel).

Figure 6:
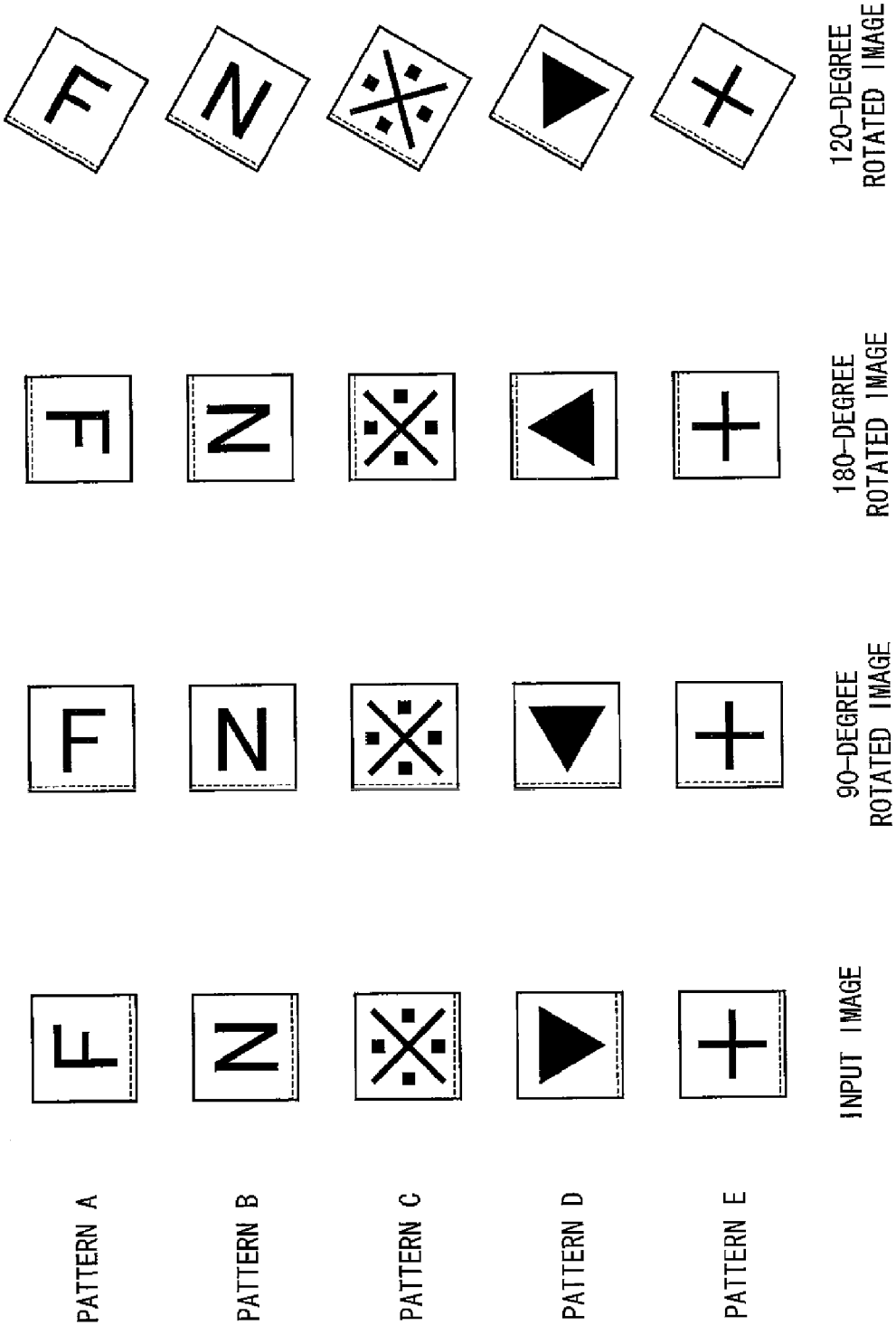
FIG. 6 is an explanatory drawing illustrating an example of a self-rotated image generated by a rotated image generating section included in the feature point calculation section in FIG. 5.

FIG. 6 is an explanatory drawing illustrating examples of input images and self-rotated images (90-degree rotated images, 180-degree rotated images, and 120-degree rotated images) generated by the rotated image generating section 46.

A method for rotating an image is not particularly limited. For example, affine transformation using a rotation matrix may be used. Further, in a case where an image is rotated by 90 degrees, a self-rotated image (90-degree self-rotated image) may be generated by calculating $(T)_{CR}=(I)_{RM-C+1}$ where column C and line R of an input partial image (I) is $(I)_{CR}$.

Further, in a case where the number of pixels in longitudinal and lateral directions does not correspond between an image before self-rotation and an image after the self-rotation (e.g. in a case of 120-degree rotation), the present invention may be arranged so that the size of a partial image is set to be larger than the size used in a later-mentioned matching test determination process, and a partial image is extracted again after the self-rotation so that the extracted partial image has the size used in the matching test determination process.

Figure 7:
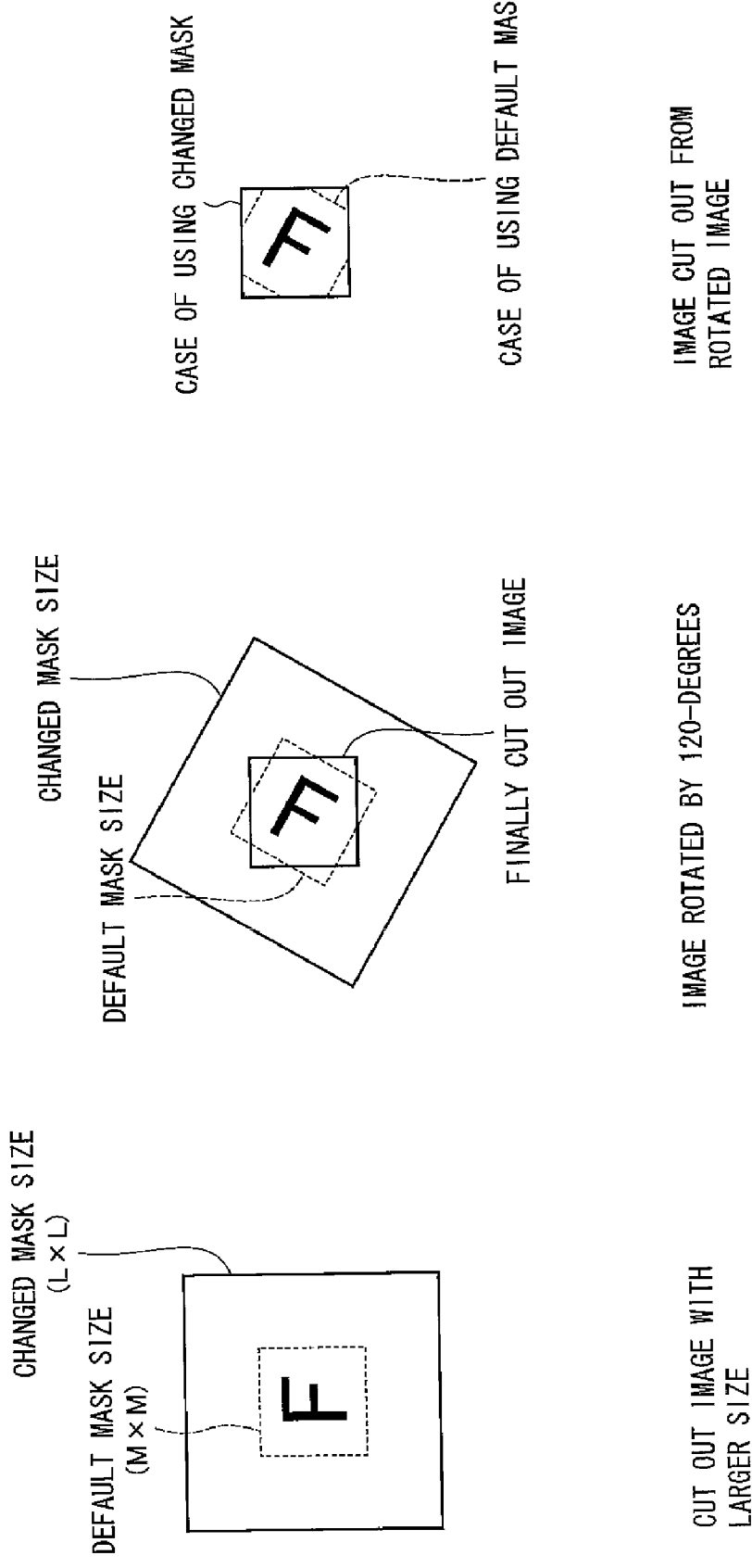
FIGS. 7($a$) to 7($c$) is an explanatory drawing illustrating a size of a partial image used in the feature point calculation section in FIG. 5.

For example, in a case where a partial image extracted from an input image has a default image size (M×M) as indicated by the broken line in FIG. 7(a), rotating the partial image by 120 degrees causes the partial image to be an image indicated by the broken line in FIG. 7(b). Consequently, as is evident from a comparison between the full line and the broken line in FIG. 7(c) (or the thick line and the broken line in FIG. 7(b)), a finally extracted partial image (partial image used in the matching test determination) does not have some of the input image.

In contrast, in a case where a partial image extracted from an input image has a size larger than a default image size (M×M) (e.g. N×N (N is an integer larger than M)), rotating the partial image by 120 degrees causes the partial image to be an image indicated by the full line in FIG. 7(b). By extracting a region with a size equal to that of the partial image used in the matching test determination, it is possible to obtain a partial image suitable for the matching test determination.

The matching test calculation section 47 calculates a correlation value (normalized correlation value, matching test) S between an input image (input partial image) and a self-rotated image.

The following further specifically explains a method for calculating a correlation value and a method for determining a matching test. In general, a correlation value S between two images Input (I) and Target (T) each including N pixels is represented by $$\{A/\sqrt{B \times C}\} \times 1000 \qquad (2)$$

where A, B, and C are represented by the following equations (3) to (5), respectively.

$$A = N \sum_{i=1}^{N} (I_i \times T_i) - \left(\sum_{i=1}^{N} I_i\right) \times \left(\sum_{i=1}^{N} T_i\right) \qquad (3)$$

$$B = N \sum_{i=1}^{N} (I_i \times I_i) - \left(\sum_{i=1}^{N} I_i\right) \times \left(\sum_{i=1}^{N} I_i\right) \qquad (4)$$

$$C = N \sum_{i=1}^{N} (T_i \times T_i) - \left(\sum_{i=1}^{N} T_i\right) \times \left(\sum_{i=1}^{N} T_i\right) \qquad (5)$$

In the present embodiment, Input (I) and Target (T) are self-rotated images and therefore it is evident that B=C. Therefore, a correlation value S can be obtained only by calculating S=(A/B)×1000, allowing simpler calculation. Further, since B is identical with the variance value busy, the variance value busy having been already calculated may be used as B, making it unnecessary to calculate B.

The matching test determination section 48 compares the correlation value S calculated by the matching test calculation section 47 with a predetermined threshold value TH_est to determine whether the input image matches the self-rotated image or not. That is, the matching test determination section 48 determines whether an image pattern included in a partial image in an input image matches an image pattern included in a self-rotated image obtained by rotating the partial image by a predetermined angle, in a case where the partial image is caused to overlap the self-rotated image. Specifically, when S>TH_est, the matching test calculation section 47 determines that the input image matches the self-rotated image, and regards a central pixel (target pixel) of the partial image as a feature point. On the other hand, when S≦TH_est, the matching test calculation section 47 determines that the input image does not match the self-rotated image. Further, the matching test determination section 48 outputs information indicative of the pixel regarded as the feature point to the features calculation section 32. Alternatively, the matching test determination section 48 causes information indicative of the pixel regarded as the feature point to be stored in the memory 8 and the features calculation section 32 reads out the information from the memory 8. The threshold value TH_est may be suitably set so that the feature point is extracted suitably.

The features calculation section 32 includes a feature point extraction section 32a, an invariant calculation section 32b, and a hash value calculation section 32c. A feature point calculated by the feature point calculation section 31 is used to calculate features (hash value and/or invariant) which are invariable relative to geometric transformation such as rotation, parallel shift, scaling up, scaling down, and the like of a document image.

Figure 8:
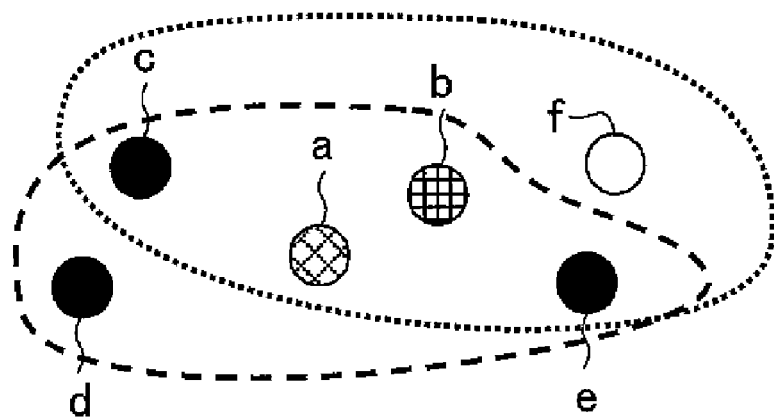
FIG. 8 is an explanatory drawing illustrating examples of a target feature point and peripheral feature points that are extracted at a time when a features calculation section in the document matching process section in FIG. 1 calculates features.

As illustrated in FIG. 8, the feature point extraction section 32a regards only one feature point as a target feature point and sequentially extracts peripheral feature points around the target feature point in such order that a feature point nearer to the target feature point is more preferentially extracted so as to extract a predetermined number of feature points (four feature points herein). In FIG. 8, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Figure 9:
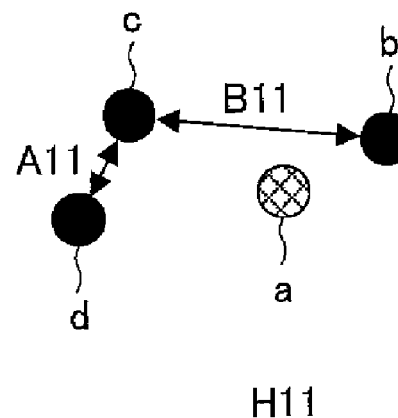
FIGS. 9($a$) to 9($c$) are explanatory drawings each illustrating an example of a combination of a target feature point and peripheral feature points that are extracted at a time when the features calculation section in the image processing apparatus in FIG. 2 calculates features.
Figure 9:
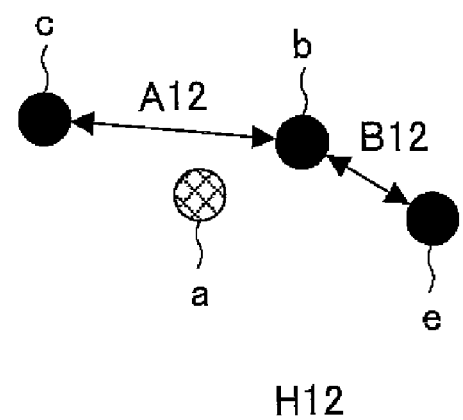
Figure 9:
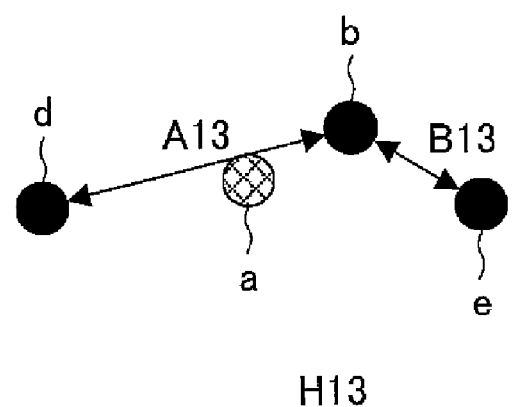

Further, the feature point extraction section 32a extracts a combination of three points which can be selected from the four peripheral feature points extracted in the foregoing manner. For example, as illustrated in FIGS. 9(a) to 9(c), in case where the feature point a in FIG. 8 is regarded as a target feature point, a combination of three feature points out of b, c, d, and e, that is, a combination of peripheral feature points b, c, and d, a combination of peripheral feature points b, c, and e, and a combination of peripheral feature points b, d, and C are extracted.

Next, the invariant calculation section 32b calculates an invariant (one of characteristic quantities) Hij of the extracted combination relative to geometrical transformation. Herein, "i" represents the number of target feature point(s) (i is an integer not less than 1), and "j" represents the number of combinations of three peripheral feature points (j is an integer not less than 1). In the present embodiment, a ratio of lengths of two lines connecting the peripheral characteristics is set as the invariant Hij. Note that, the lengths of the lines are calculated in accordance with coordinates of the peripheral characteristics. For example, in FIG. 9(a), when a length of a line connecting the feature point c and the feature point d is A11 and a length of a line connecting the feature point c and the feature point b is B11, the invariant H11 is such that H11=A11/B11. Further, in FIG. 9(b), when a length of a line connecting the feature point c and the feature point b is A12 and a length of a line connecting the feature point b and the feature point e is B12, the invariant H12 is such that H12=A12/B12. Further, in FIG. 9(c), when a length of a line connecting the feature point d and the feature point b is A13 and a length of a line connecting the feature point b and the feature point e is B13, the invariant H13 is such that H13=A13/B13. In this manner, the invariants H11, H12, and H13 are calculated in the examples illustrated in FIGS. 9(a) to 9(c). Note that, in the foregoing examples, a line connecting a peripheral feature point positioned at the left side in the horizontal direction and a peripheral feature point positioned at the center in the horizontal direction is indicated as Aij and a line connecting a peripheral feature point positioned at the center in the horizontal direction and a peripheral feature point positioned at the right side in the horizontal direction is indicated as Bij, but the definition is not limited to this, and the lines used to calculate the invariant Hij may be set in any manner.

Next, the hash value calculation section 32c calculates a remainder of $(Hi1 \times 10^2 + Hi2 \times 10^1 Hi3 \times 10^0)/D$ as a hash value (one of features) Hi and stores the calculated Hi into the memory 8. Note that, D is a constant number which is set beforehand according to a range which is to be set as a remainder value range.

Note that, how to calculate the invariant Hij is not particularly limited. For example, a value calculated in accordance with a compound ratio of five points in the vicinity of the target feature point, or a value calculated in accordance with a compound ratio of five points extracted from n points in the vicinity of the target feature point (n is such an integer that n≧5), or a value calculated in accordance with an arrangement of m points extracted from n points in the vicinity of the target feature point (m is such an integer that m<n and m≧5) and a compound ratio of five points extracted from the m points may be set as the invariant Hij relative to the target feature point. Note that, the compound ratio is a value calculated from four points in a straight line or from five points on a plane and is known as an invariant relative to projective transformation which is a kind of geometric transformation.

Further, calculation of the hash value Hi is not limited to calculating a remainder of the expression $(Hi1\times10^2+Hi2\times10^1+Hi3\times10^0)/D$ and regarding the remainder as the hash value Hi, and other hash function (for example, any one of hash functions mentioned in Patent Document 2) may be used.

Further, when extraction of peripheral feature points around a target feature point and calculation of the hash value Hi are completed, each section of the features calculation section 32 focuses on another feature point to change the target feature point and performs extraction of peripheral feature points and calculation of a hash value. In this manner, each section of the features calculation section 32 calculates hash values corresponding to all the feature points.

Figure 10:
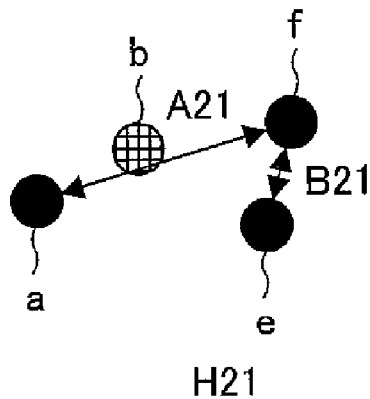
FIGS. 10($a$) to 10($c$) are explanatory drawings each illustrating an example of a combination of a target feature point and peripheral feature points that are extracted at a time when the features calculation section in the image processing apparatus in FIG. 2 calculates features.
Figure 10:
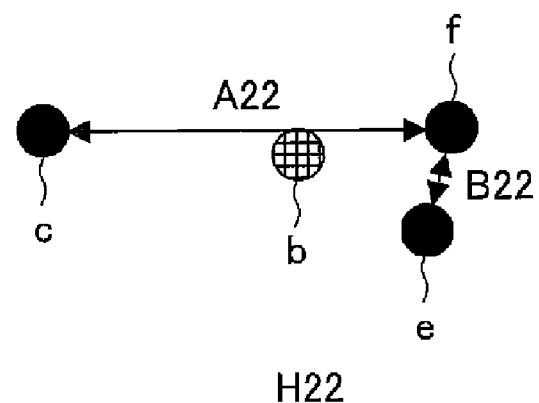
Figure 10:
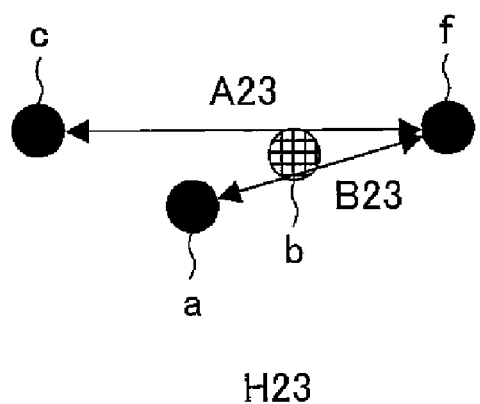

In FIG. 8, when extraction of peripheral feature points around a feature point a regarded as a target feature point and calculation of a hash value are completed, peripheral feature points around a feature point b regarded as a target feature point are extracted and a hash value is calculated. In FIG. 8, four feature points a, c, e, and f are extracted as peripheral feature points in case where the feature point b is regarded as a target feature point. Further, as illustrated in FIGS. 10(a) to 10(c), a combination of three points (peripheral feature points a, e, and f, peripheral feature points c, e, and f, peripheral feature points a, c, and f) selected from the peripheral feature points a, c, e, and f is extracted and a hash value corresponding to the combination is calculated, and the calculated hash value is stored in the memory 8. Further, this process is repeated so as to correspond to the number of the feature points, thereby calculating hash values corresponding to the respective feature points each of which is regarded as the target feature point. Then, the calculated hash values are stored in the memory 8.

Note that, how to calculate the invariant when the feature point a is regarded as the target feature point is not limited to the aforementioned manner. For example, it may be so arranged that: as illustrated in FIG. 22(a) to FIG. 22(d), in case where the feature point a illustrated in FIG. 8 is regarded as the target feature point, a combination of three points out of peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted, and an invariant (one of characteristic quantities) Hij relative to geometric transformation is calculated with respect to each of the extracted combinations.

Further, it may be so arranged that: in case where the feature point b illustrated in FIG. 8 is regarded as the target feature point, as illustrated in FIGS. 23(a) to 23(d), a combination of three points (peripheral feature points a, e, and f, peripheral feature points a, c, and e, peripheral feature points a, f, and c, peripheral feature points e, f, and c) is extracted from four feature points a, c, e, and f, and an invariant Hij relative to geometric transformation is calculated with respect to each combination. Note that, in this case, a remainder of $(Hi1\times10^3+Hi2\times10^2+Hi3\times10^1+Hi4\times10^0)/D$ is calculated as a hash value, and the calculated hash value is stored in the memory 8.

Further, in the aforementioned example, a line connecting a peripheral feature point nearest to the target feature point and a peripheral feature point secondarily nearest to the target feature point is Aij and a line connecting the peripheral feature point nearest to the target feature point and a peripheral feature point thirdly nearest to the target feature point is Bij, but the definition is not limited to this. The lines used to calculate the invariant Hij may be set in any manner as in such a manner that the lines are set in accordance with a length of each of lines connecting the peripheral feature points.

Note that, in case of storing the input image data as a reference image, the features calculation section 32 transmits the hash value (features) calculated in the foregoing manner and corresponding to each feature of the input image data to the storage process section 37. Further, in case of determining whether input image data is image data of a reference image having been already stored (similarity determination process), the features calculation section 32 transmits the hash value calculated in the foregoing manner and corresponding to each feature of the input image data to the voting process section 33.

The storage process section 37 sequentially stores (i) hash values calculated by the features calculation section 32 and corresponding to the respective feature points and (ii) indices (document IDs) each indicative of a document (input image data) to the hash table 103 provided in the memory 8 in such a manner that the hash values and the indices are related to each other (see FIG. 11(a). In case where the hash values have already been stored, the document IDs are stored with them respectively corresponding to the hash values. Document IDs are serially assigned to respective documents without any duplication. Note that, in case where the number of documents stored in the hash table 103 is larger than a predetermined value (for example, 80% of the number of documents which can be stored), old document IDs may be searched and sequentially deleted. Further, the deleted document IDs may be reused as document IDs of new input image data. Further, in case where the calculated hash values are identical with each other (H1=H5 in FIG. 11(b)), these values may be collectively stored into the hash table 103.

Figure 12:
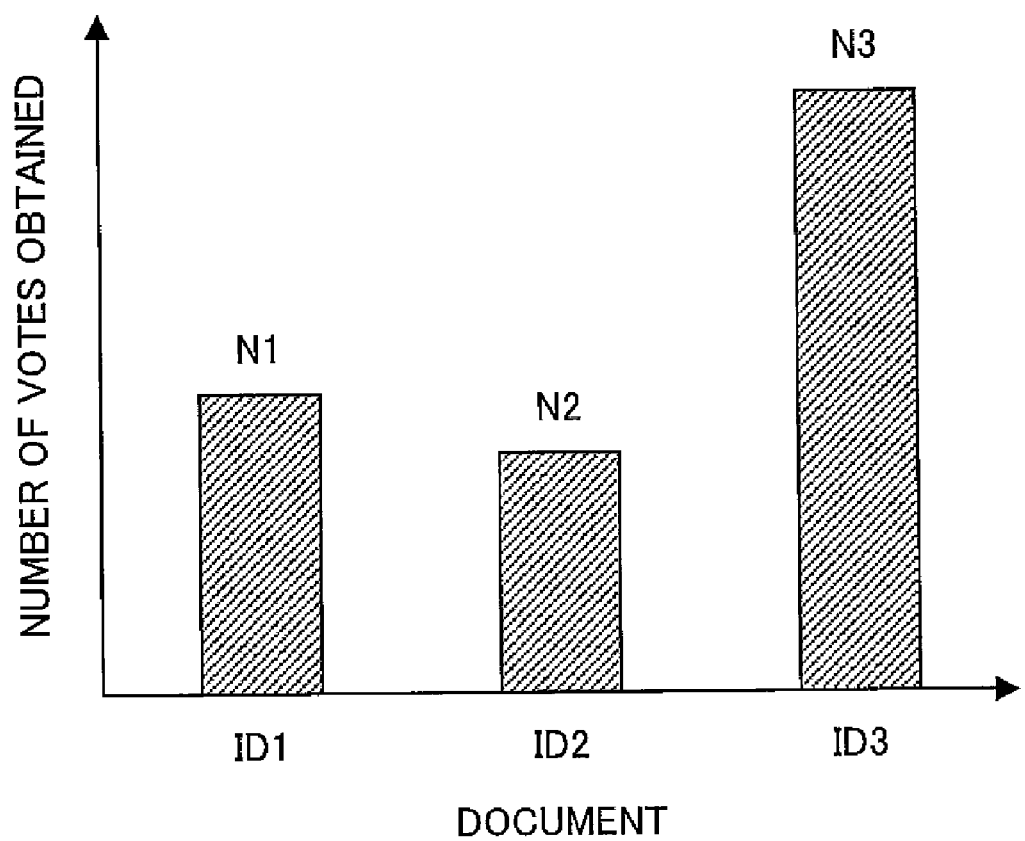
FIG. 12 is a graph showing an example of the number of votes for each reference image (the number of votes obtained for each reference image) in a voting process section included in the document matching process section in FIG. 1.

The voting process section 33 compares the hash value calculated from the input image data and corresponding to each feature point with the hash value stored in the hash table 103 so as to vote for a reference image having the same hash value. In other words, there is counted the number of times the same hash value as a hash value of the reference image is calculated from the input image data for each reference image, and the counted number is stored in the memory 8. FIG. 12 is a graph illustrating an example of the number of votes for reference images ID1, ID2, and ID3.

The similarity determination process section 34 reads out a vote result of the voting process section 33 (an index of each reference image and the number of votes for each reference image: a similarity) from the memory 8, and extracts the maximum number of votes obtained and an index of a reference image with the maximum number of votes obtained. Further, the similarity determination process section 34 compares the maximum number of votes obtained with a predetermined threshold value THa so as to determine whether there is any similarity or not (whether the input image data is identical with image data of the reference image or not), and sends a determination signal indicative of the determination result to the control section 7. That is, in case where the maximum number of votes obtained is not less than the predetermined threshold value THa, it is determined that "there is a similarity (the input image data is identical with image data of the reference image)", and in case where the maximum number of votes is less than the threshold value THa, it is determined that "there is no similarity (the input image data is not identical with image data of the reference image)".

Alternatively, it may be so arranged that: the similarity determination process section 34 divides the number of votes obtained for each reference image by a total number of votes (total number of feature points extracted from the input image data) and normalizes the result so as to calculate the similarity, thereby comparing the similarity with the predetermined threshold value THa (80% of the number of total votes for example) to determine the similarity.

Further, it may be so arranged that: the similarity determination process section 34 divides the number of votes obtained for each reference image by the number of times of storing a hash value (maximum number of times a hash value is stored) corresponding to a reference image whose hash value is most frequently stored and normalizes the result so as to calculate the similarity, thereby comparing the similarity with the predetermined threshold value THa (80% of the number of total votes for example) to determine the similarity. That is, in case where the calculated similarity is not less than a threshold value THa, it is determined that "there is a similarity", and in case where the calculated similarity is less than the threshold value THa, it is determined that "there is no similarity". Note that, in this case, the total number of hash values extracted from the input image data may be larger than the maximum number of times of storing a hash value (particularly, a case where the document and/or the reference image partially has a handwritten part), so that the calculated value of the similarity may exceed 100%.

Further, the threshold value THa in determining the similarity may be constant for each reference image or may be set for each reference image in accordance with importance or the like of the reference image. As to the importance of the reference image, for example, a paper currency, a valuable stock certificate, a top-secret document, a restricted document, and the like are regarded as having maximum importance, and a secret document is regarded as being less important than a paper current or the like. In this manner, the importance may be set by stages according to each reference image. In this case, a weighting coefficient according to importance of a reference image is stored in the memory 8 with the weighting coefficient corresponding to an index of the reference image, and the similarity determination process section 34 determines the similarity by using the threshold value THa corresponding to the reference image with the maximum number of votes obtained.

Further, it may be so arranged that: in determining the similarity, the threshold value THa is made constant and the number of votes for each reference image (the number of votes obtained for each reference image) is multiplied by a weighting coefficient of each reference image so as to determine the similarity. In this case, the weighting coefficient according to the importance of each reference image is stored in the memory 8 with the weighting coefficient corresponding to an index of each reference image, and the similarity determination process section 34 calculates a corrected number of obtained votes by multiplying the number of obtained votes of each reference image by the weighting coefficient of the reference image, thereby determining the similarity in accordance with the corrected number of obtained votes. For example, a maximum corrected number of obtained votes may be compared with the threshold value THa, or a value obtained by normalizing the maximum corrected number of obtained votes by the number of total votes may be compared with the threshold value THa, or a value obtained by normalizing the maximum corrected number of obtained votes by the maximum number of times of storage may be compared with the threshold value THa. Further, in this case, for example, the weighting coefficient is set to be more than 1 and to be larger as the importance of the reference image is higher.

Further, in the present embodiment, a single hash value is calculated for a single feature point (target feature point), but the present invention is not limited to this, and it may be so arranged that a plurality of hash values are calculated for a single feature point (target feature point). For example, it may be so arranged that: six points are extracted as peripheral feature points around the target feature point, and three points are extracted from five points for each of six combinations obtained by extracting five points from the six points, so as to calculate an invariant, thereby calculating a hash value. In this case, six hash values are calculated for a single feature point.

(1-3. Process of Digital Color Multi-Function Printer 1)

Figure 13:
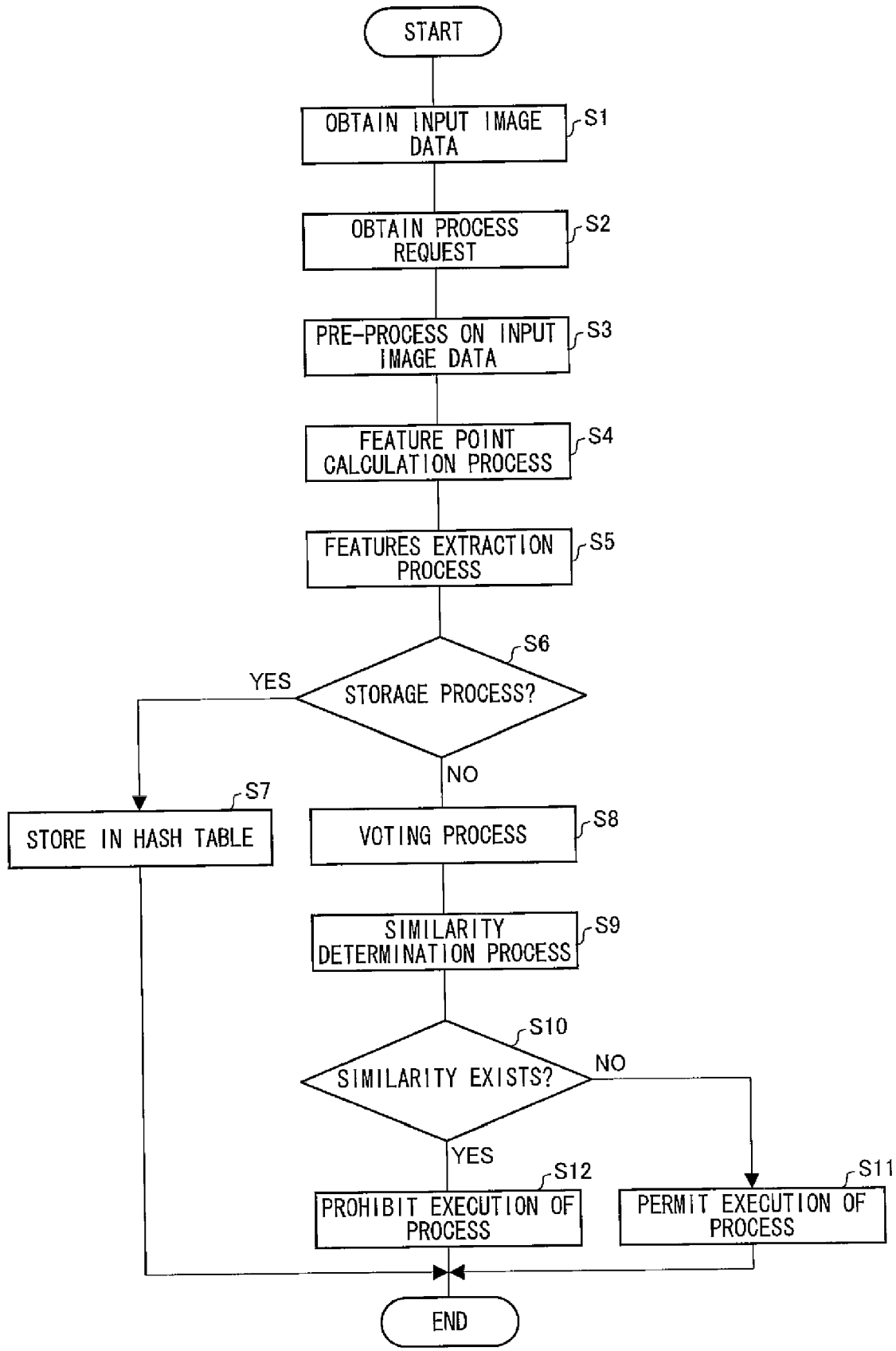
FIG. 13 is a flowchart illustrating a flow of a process in the document matching process section in FIG. 1.

The following explains a process in the digital multi-function printer 1 with reference to the flowchart in FIG. 13.

First, the control section 7 obtains input image data and a process request (instruction input) entered by a user via the operation panel 6 or the communication device 5 (S1 and S2). The control section 7 may obtain input image data by the color image input apparatus 2 reading a document image, or by the communication device 5 obtaining input image data transmitted from an external apparatus, or by reading input image data from storage media via a card reader (not shown) included in the digital color multi-function printer 1.

Next, the control section 7 causes the pre-process section 30 to perform a pre-process (such as an achromatizing process, a resolution conversion process, and an MTF process) on the input image data (S3), causes the feature point calculation section 31 to perform a feature point calculation process (S4), and causes the features calculation section 32 to calculate features (S5). The feature point calculation process will be detailed later.

Next, the control section 7 judges whether a process requested by the process request is a storage process or not (S6). When judging that the storage process is requested, the control section 7 causes the features calculated by the features calculation section 32 and a document ID (ID of a reference image) to be stored in the hash table 103 in such a manner that the features and the document ID are related to each other (S7).

On the other hand, when judging that the storage process is not requested (similarity determination process is requested), the control section 7 causes the voting process section 33 to perform a voting process (S8), and causes the similarity determination process section 34 to perform a similarity determination process (S9).

When determining in S9 that a similarity exists, the control section 7 prohibits an image process (such as copying, printing, electronic distribution, facsimile transmission, filing, correction of image data, and editing) on the input image data (S10), and finishes the process. On the other hand, when judging that a similarity does not exist, the control section 7 permits the image process on the input image data (S11), and finishes the process. In the present embodiment, an explanation is made as to a case where the image process is prohibited when a similarity exists and the image process is permitted when a similarity does not exist. However, the present invention is not limited to this case. For example, a result of similarity determination may be notified to a predetermined notification destination. Further, the present invention may be arranged so that whether to store input image data or not, whether to superpose a predetermined sign etc. on an output image corresponding to the input image data or not, whether to perform user authentication or not, whether to display a result of similarity determination or not etc. are determined in accordance with the result of similarity determination.

Figure 14:
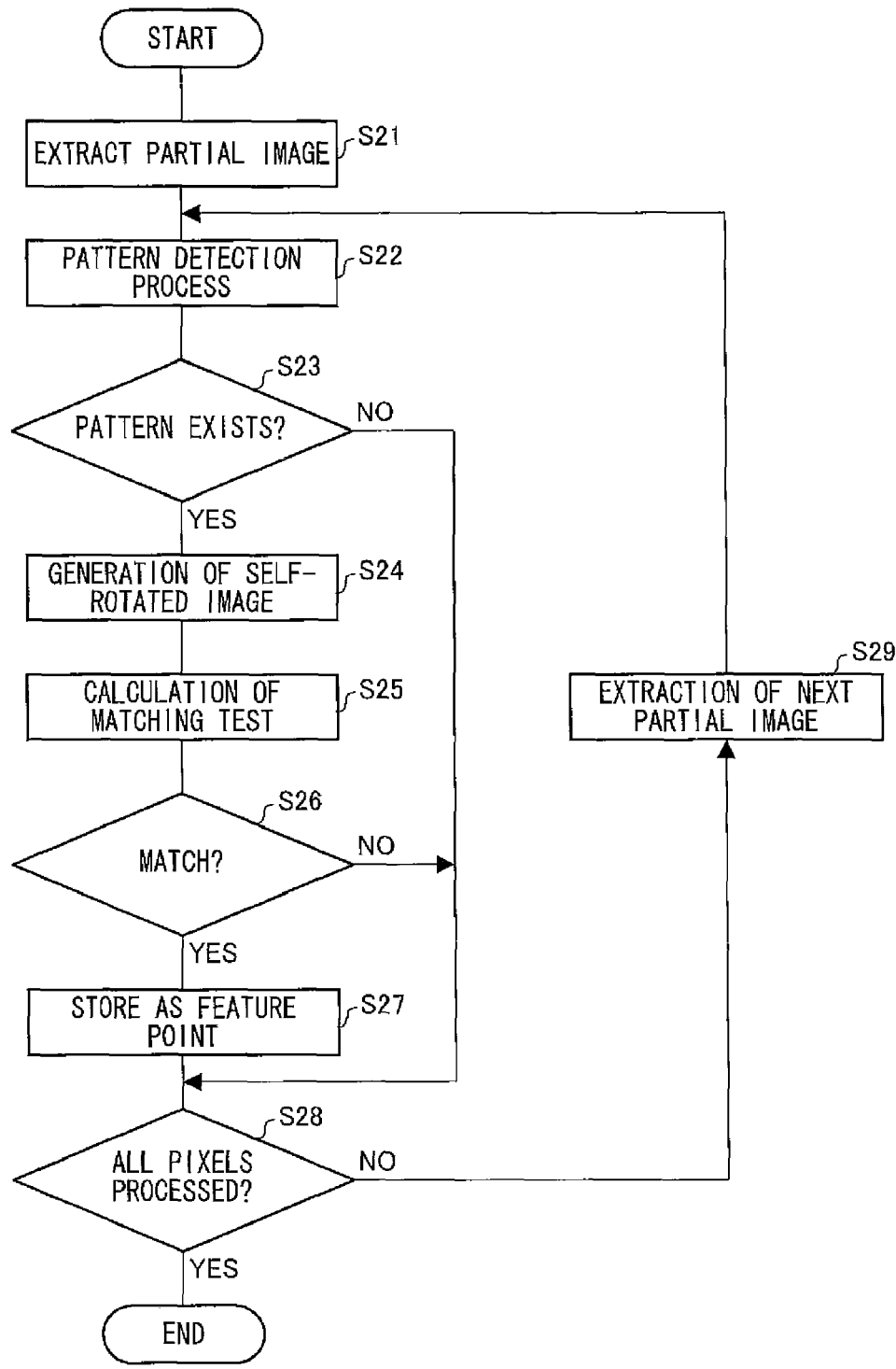
FIG. 14 is a flowchart illustrating a flow of a process in the feature point calculation section included in the document matching process section in FIG. 1.

FIG. 14 is a flowchart illustrating a flow of the feature point calculation process (process of S4) by the feature point calculation process section 31.

As illustrated in FIG. 14, when input image data is supplied from the pre-process section 30 to the feature point calculation section 31, the control section 7 causes the pattern detection process section 45 to extract a partial image (e.g. to cut out partial image having M×M pixels) (S21) so that a pattern detection process is performed (S22). Then, in accordance with a result of the pattern detection process, the control section 7 judges whether an effective pattern exists or not in the partial image (S23).

When judging in S23 that the effective pattern exists, the control section 7 causes the rotated image generating section 46 to generate a self-rotated image of the partial image extracted in S21 (S24). Then, the control section 7 causes the matching test calculation section 47 to calculate a matching test between the partial image extracted in S21 and the self-rotated image generated in S24 (S25). Further, the control section 7 causes the matching test determination section 49 to determine whether the partial image matches the self-rotated image or not (S26).

When it is determined in S26 that the partial image matches the self-rotated image, the control section 7 causes a central pixel (target pixel) of the partial image to be stored as a feature point in the memory 8 (S27). Alternatively, the control section 7 outputs, to the feature point calculation section 31, information indicating that a central pixel (target pixel) in the partial image is regarded as a feature point.

After the process of S27, or when it is judged in S23 that the effective pattern does not exist, or when it is determined in S26 that the partial image does not match the self-rotated image, the control section 7 judges whether the pattern detection process has been performed with respect to all pixels in input image data or not (S28). That is, the control section 7 judges whether the pattern detection process has been performed with respect to each partial image extracted when each of all pixels in input image data is regarded as a target pixel.

When a pixel having not been subjected to the pattern detection process exists, the control section 7 causes a target pixel to be raster-scanned, and causes the next target pixel to be subjected to the process of S22 and the subsequent processes (S29). On the other hand, when judging that all pixels have been subjected to the pattern detection process, the control section 7 finishes the feature point calculation process.

As described above, in the document matching process section 13 of the digital color multi-function printer 1 of the present embodiment, a partial image is extracted from input image data, it is judged whether the extracted partial image includes a pattern or not, and when the extracted partial image includes a pattern, it is determined whether the partial image matches a self-rotated image obtained by rotating the partial image or not. When the partial image matches the self-rotated image, a target pixel of the partial image is extracted as a feature point.

Consequently, even when input image data has been read while a document was positioned on a reading position of an image reading apparatus in such a manner that the document was skewed with respect to a predetermined positioning angle, or even when input image data has been enlarged or reduced, it is possible to extract, as a feature point, a central point (target pixel) of a partial image free from the influence of the skew, the enlarging, the reducing etc. (or partial image little influenced by the skew, the enlarging, the reducing etc.). That is, regardless of the skew, the enlarging, the reducing etc., it is possible to extract a feature point having the same pattern with high accuracy, so that a ratio of a distance between calculated feature points does not change. Therefore, by calculating a similarity of images in accordance with features calculated from the feature point thus extracted, it is possible to determine a similarity between an input image and a reference image with high accuracy, regardless of the skew, the enlarging or the reducing.

Figure 15:
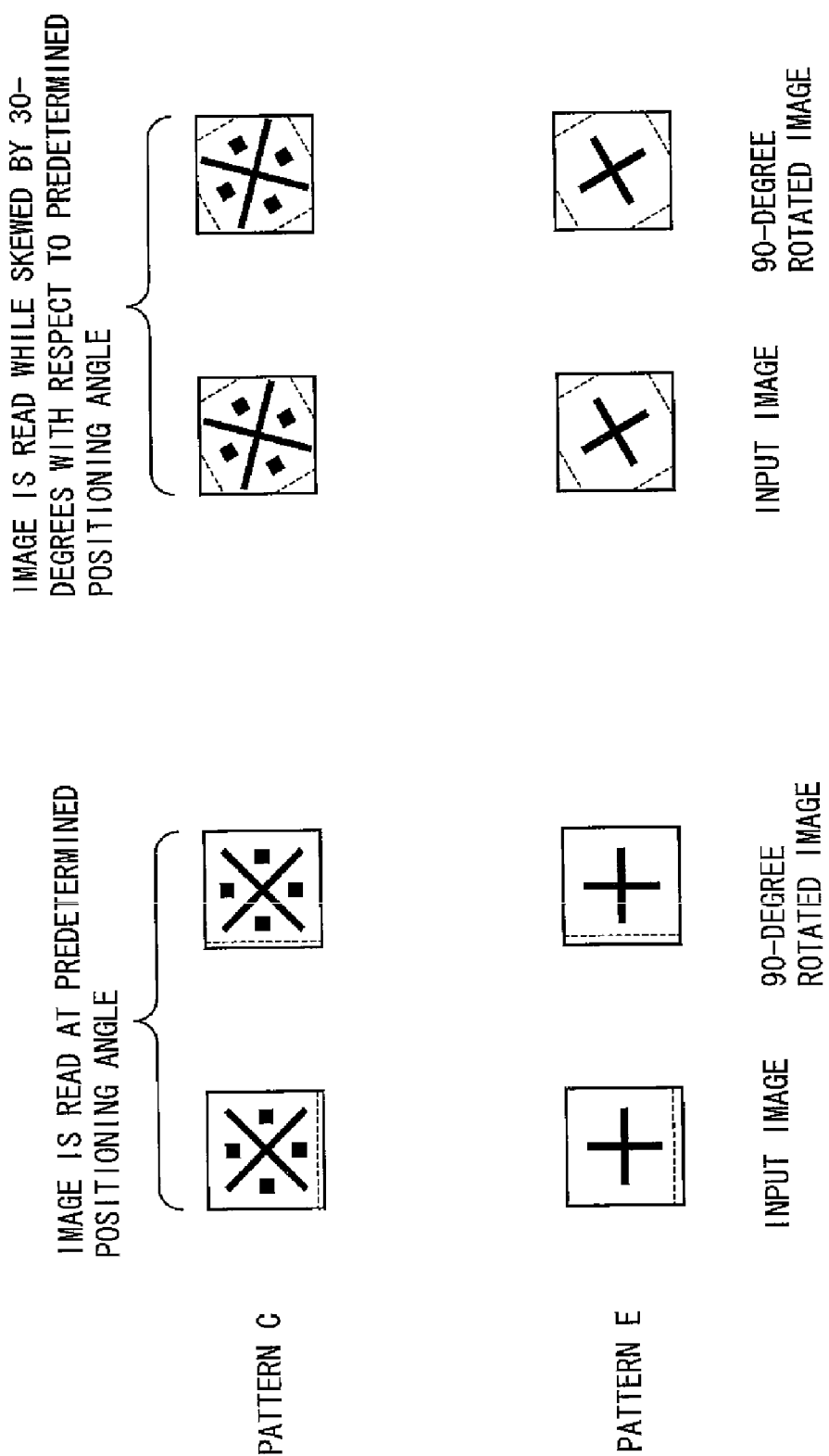
FIG. 15 is an explanatory drawing illustrating an example of a relation among an angle at which a document is skewed with respect to a predetermined position angle of a reading position of an image reading apparatus, a partial image of input image data read from the document, and a self-rotated image obtained by rotating the partial image.

FIG. 15 is a drawing illustrating a partial image of input image data that has been read while forming an appropriate angle with respect to a predetermined positioning angle of a reading position of an image reading apparatus, a 90-degree rotated image obtained by rotating the partial image by 90-degrees, a partial image of input image data that has been read while being skewed by 30 degrees with respect to a predetermined positioning angle of a reading position of an image reading apparatus, and a 90-degree rotated image obtained by rotating the partial image. As illustrated in FIG. 15, even when input image data is read while a document is skewed with respect to a predetermined positioning angle of a reading position of an image reading apparatus, by regarding as a feature point a target pixel of a partial image matching a self-rotated image of the partial image, it is possible to accurately extract a feature point having the same pattern, without the influence of the skew.

Figure 16:
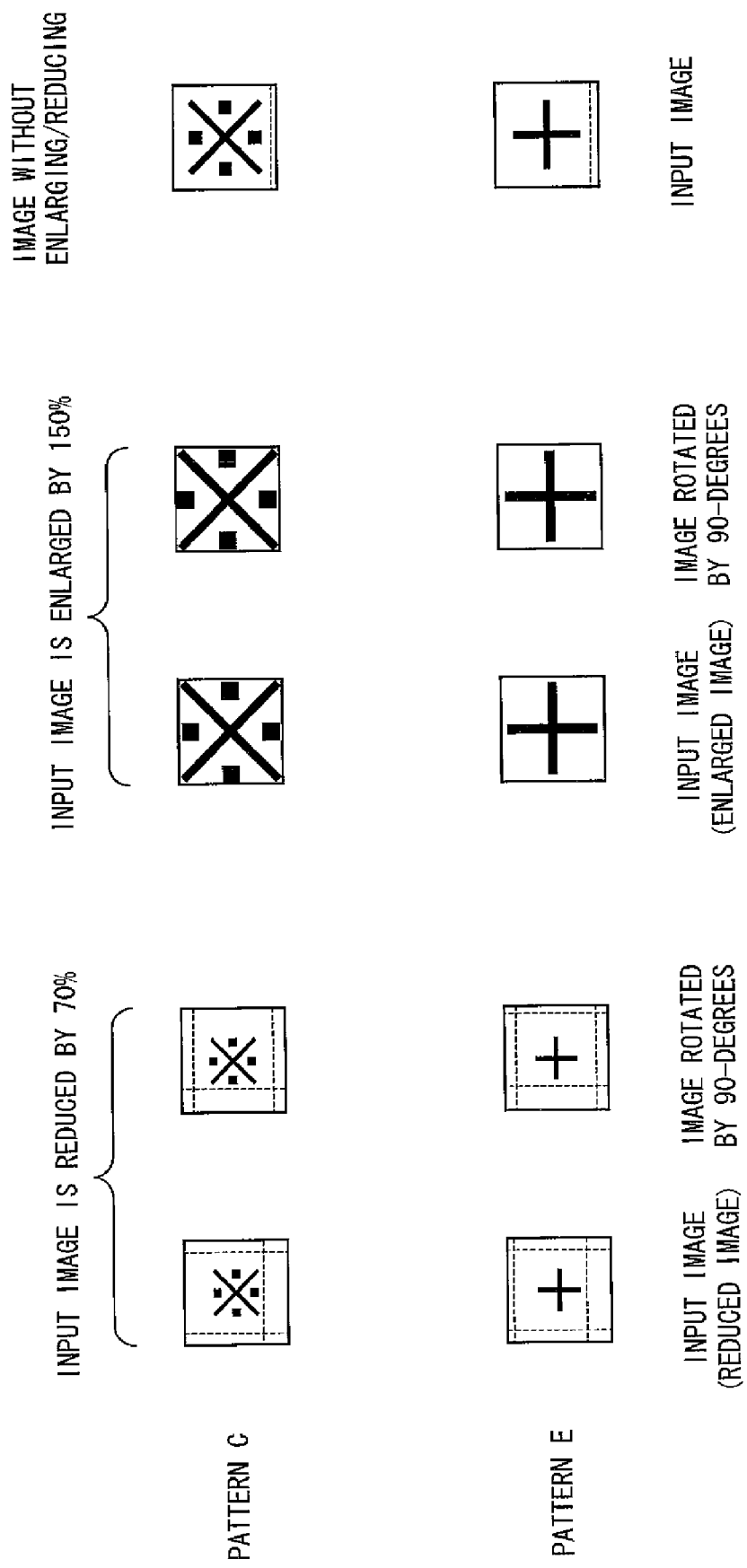
FIG. 16 is an explanatory drawing illustrating an example of a relation among a partial image of input image data, a partial image of image data obtained by enlarging/reducing the input image data, and a self-rotated image obtained by rotating the partial image.

FIG. 16 is an explanatory drawing illustrating examples of a partial image of input image data having been reduced by 70%, a 90-degree rotated image obtained by rotating the partial image by 90-degrees, a partial image of input image data having been enlarged by 150%, a 90-degree rotated image obtained by rotating the partial image by 90 degrees, and a partial image in an input image having not been enlarged/reduced. As illustrated in FIG. 16, even when input image data has been subjected to a scaling up/down process (enlarged or reduced), by regarding as a feature point a target pixel of a partial image matching a self-rotated image of the partial image, it is possible to accurately extract a feature point having the same pattern, without the influence of the skew.

Further, in the present embodiment, a set of local feature points are determined out of the extracted feature points, a partial set of feature points is selected out of the determined set of local feature points, invariants relative to geometric transformation each as a value characterizing the selected partial set are calculated in accordance with plural combinations of feature points in the partial set, and hash values (features) are calculated by combining the calculated invariants. This allows determining a similarity between an input image and a reference image with higher accuracy.

Further, with the foregoing arrangement, a feature point can be easily extracted only by extracting a partial image and determining whether the extracted partial image matches a self-rotated image created by rotating the partial image (whether self-correlation exists or not). This allows the feature point calculation section 31 to have a simpler circuit configuration, allowing the feature point calculation section 31 to be more easily realized by hardware.

Further, in general, a handwritten text does not exhibit a high degree of matching (self-correlation) with a self-rotated image of the handwritten text. Therefore, even when an input image includes a handwritten text, it is possible to prevent extraction of an inappropriate feature point due to the handwritten text. Therefore, with the foregoing arrangement, even when the input image includes a handwritten text, it is possible to appropriately extract a feature point of the input image.

In the present embodiment, an explanation is made as to a case where when a partial image matches a self-rotated image of the partial image, a target pixel in the partial image is extracted as a feature point. However, the present invention is not limited to this case. For example, a block consisting of plural pixels including the target pixel in the partial image may be extracted as a feature point.

Further, in the present embodiment, an explanation was made as to a case where self-rotation angle R is 90 degrees, 120 degrees, and 180 degrees. However, the self-rotation angle R is not limited to these and may be set to any angle.

Further, in the present embodiment, an explanation was made as to a case where a feature point is extracted by determining whether a partial image matches a self-rotated image obtained by rotating the partial image by a predetermined self-rotation angle R. However, the present invention is not limited to this case. For example, the present invention may be arranged so that a matching test between a partial image and each of plural kinds of self-rotated images obtained by rotating the partial image by plural self-rotation angles is calculated, and whether to regard the central pixel of the partial image as a feature point or not is determined in accordance with the matching test between the partial image and each of the plural kinds of self-rotated images.

Table 1 shows results of determining matching tests of patterns A to E in FIG. 6 to respective 90-degree rotated images, respective 180-degree rotated images, and respective 120-degree rotated images.

TABLE 1

| | Self-rotation angle | | |
|---|---|---|---|
| | 90 degrees | 180 degrees | 120 degrees |
| Pattern A | X | X | X |
| Pattern B | X | ○ | X |
| Pattern C | ○ | ○ | X |
| Pattern D | X | X | ○ |
| Pattern E | ○ | ○ | X |

In Table 1, ○ indicates a pattern determined as matching between a partial image and a self-rotated image thereof, and x indicates a pattern determined as not matching between the partial image and the self-rotated image.

As shown in Table 1, the results of matching tests are different according to each self-rotation angle R. Therefore, by calculating a matching test with respect to each of a plurality of self-rotated images, patterns that are different with respect to each self-rotation angle are extracted as a pattern matching between the input image and the self-rotated image.

For example, a target pixel of a pattern determined as matching between a partial image and plural self-rotated images with respective self-rotation angles may be regarded as a feature point, or a target pixel of a pattern determined as matching between a partial image and any one of plural self-rotated images with respective self-rotation angles may be regarded as a feature point, or a target pixel of a pattern determined as matching between a partial image and more than the predetermined number of images out of plural self-rotated images with respective self-rotation angles may be regarded as a feature point.

In this manner, by extracting a feature point in accordance with a result of determining degrees of matching between a partial image and plural self-rotated images with respective angles, it is possible to easily increase the number of feature points. This allows determining a similarity between an input image and a reference image in accordance with more number of feature points, further increasing accuracy in similarity determination.

In the present embodiment, an explanation was made as to a case where when the control section 7 causes the pattern detection process section 45 to extract a partial image, a partial image with M×M in size is cut out. However, a method for cutting out a partial image is not limited to this. For example, not only a partial image with M×M in size but also a partial image with L×L (L>M) in size are targeted, and a feature point is obtained in accordance with the similar calculation.

Figure 24:
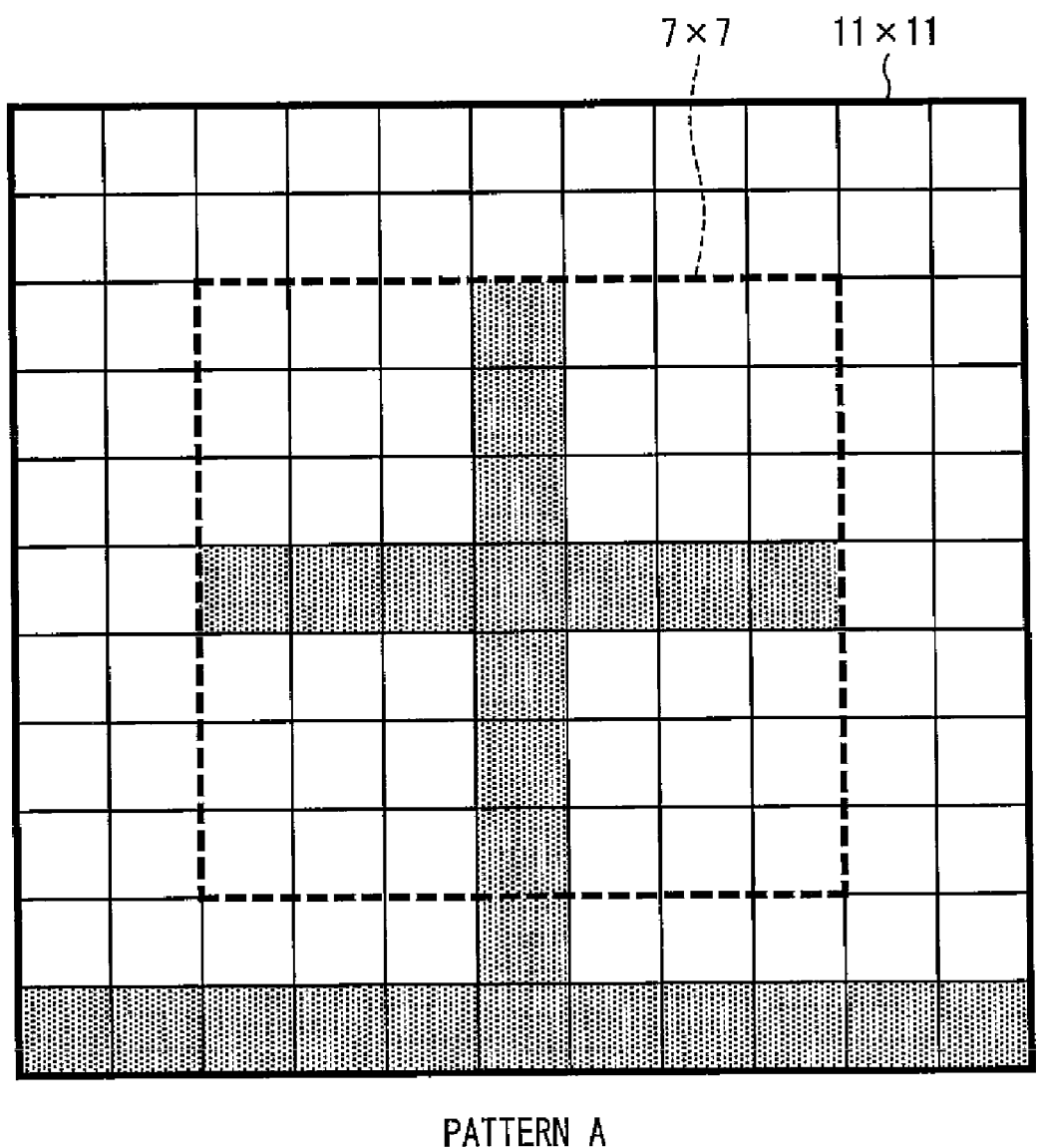
FIG. 24 is an explanatory drawing illustrating an example of a partial image.
Figure 25:
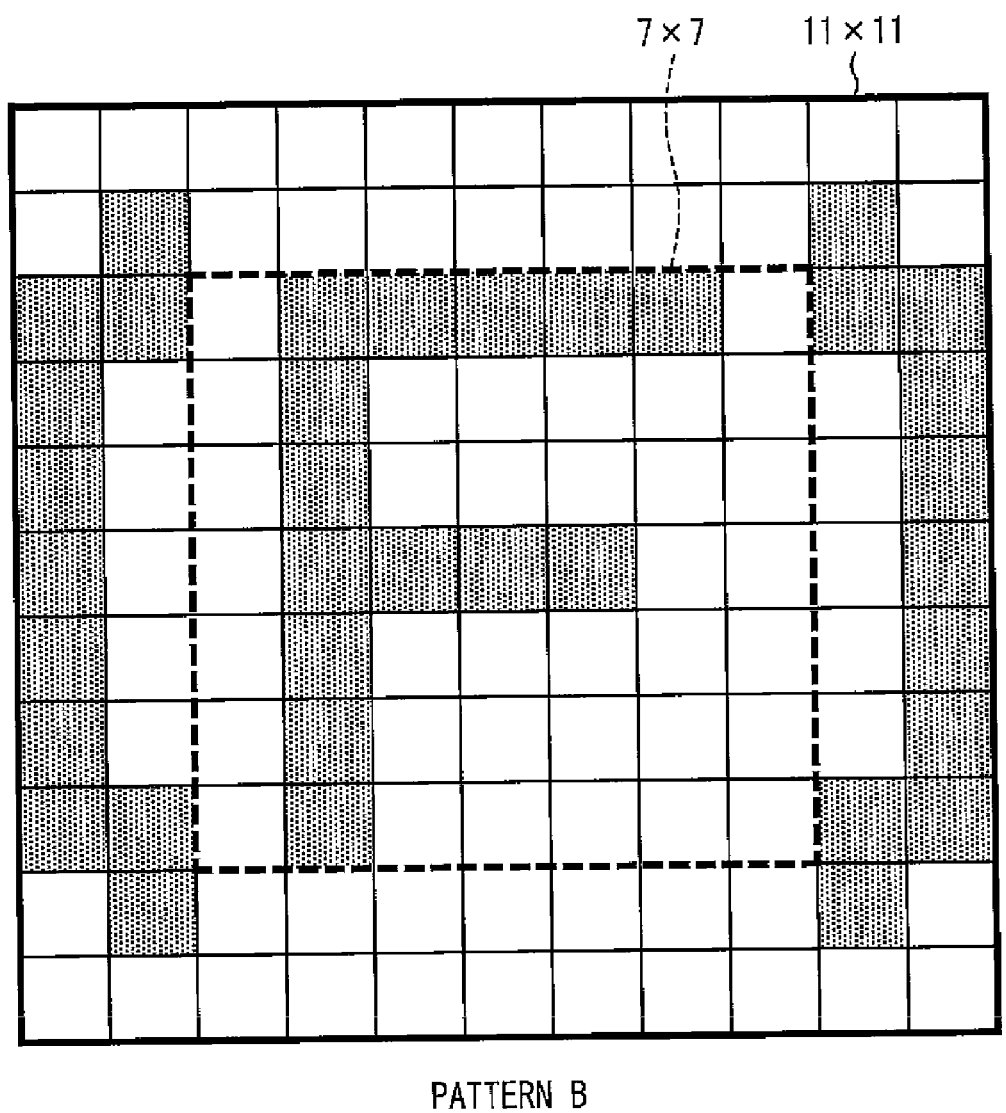
FIG. 25 is an explanatory drawing illustrating an example of a partial image.
Figure 26:
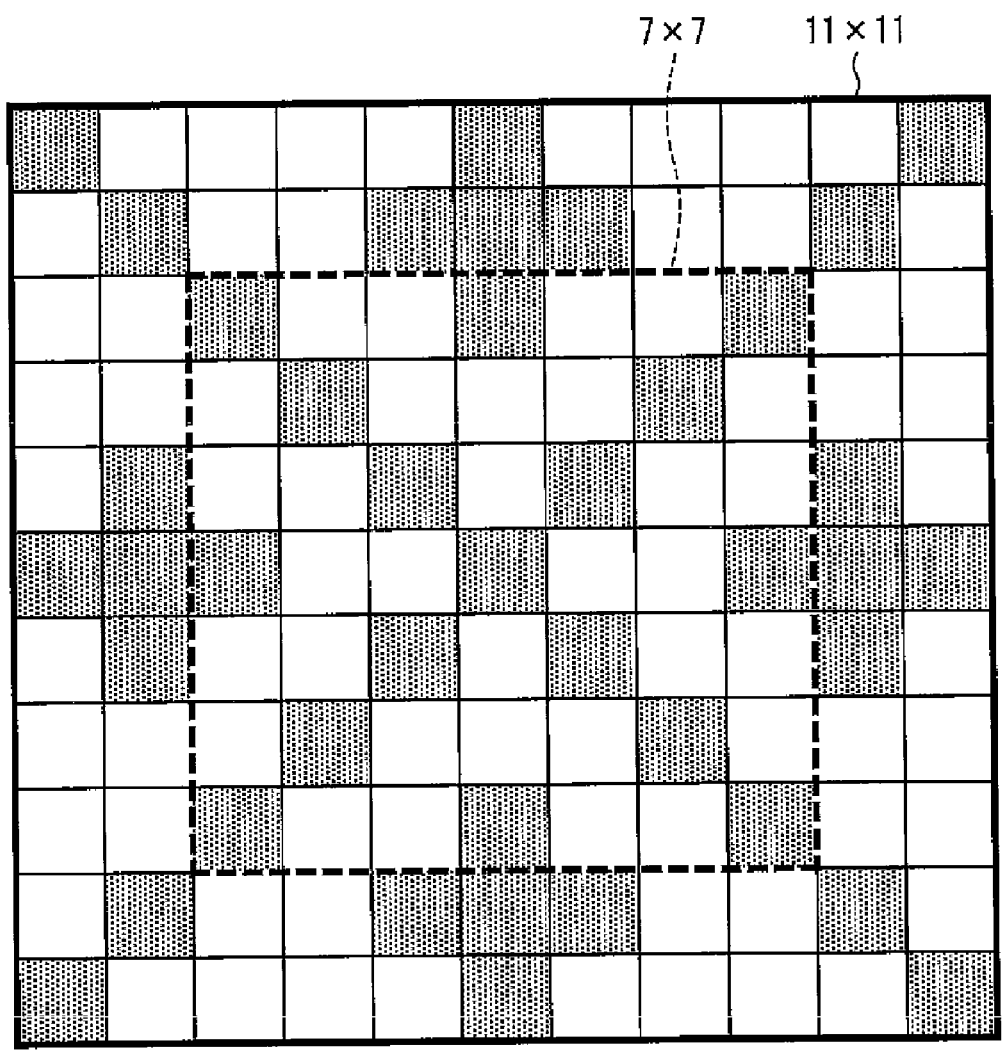
FIG. 26 is an explanatory drawing illustrating an example of a partial image.

For example, assume a case where M=7 and L=11, and partial images are extracted while central points of patterns A to C of FIGS. 24 to 26, respectively, are regarded as target points. Frame regions surrounded by broken lines in FIGS. 24 to 26 are partial images with 7×7 in size, and frame regions surrounded by full lines in FIGS. 24 to 26 are partial images with 11×11 in size.

As regards the partial images with the above sizes, a matching test between an extracted partial image and a self-rotated image obtained by rotating the partial image by 180 degrees is determined. In a case of Pattern A, when the partial image has 7×7 pixels, the partial image matches the self-rotated image, whereas when the partial image has 11×11 pixels, the partial image does not match the self-rotated image. In a case of Pattern B, both when the partial image includes 7×7 pixels and when the partial image includes 11×11 pixels, the partial image does not match the self-rotated image. In a case of Pattern C, both when the partial image includes 7×7 pixels and when the partial image includes 11×11 pixels, the partial image matches the self-rotated image. As described above, even when a partial image is extracted from the same pattern, whether the partial image matches its self-rotated image or not varies according to the size with which the partial image is extracted (pixel size of the partial image).

Further, in the case of Pattern B, both when the partial image includes 7×7 pixels and when the partial image includes 11×11 pixels, the partial image does not match the self-rotated image. However, when it is determined whether the partial image having 11×11 pixels matches the self-rotated image or not while the partial image having 7×7 pixels is excluded from calculation (is masked), the partial image having 11×11 pixels matches the self-rotated image.

A calculation method with such exclusion is performed in such a manner that a masked region is excluded with respect to each sigma in the above equations (3) to (5). In a case of the equation (3), when a partial image has 7×7 pixels and the number of pixels is Nm (=49), $$Am = N_m \sum_{i=1}^{Nm} (Tm_i \times Im_i) - \sum Tm_i \times \sum Im_i \qquad (6)$$

When a partial image has 11×11 pixels and the number of pixels is Nl (121), $$Al = Nl \sum_{i=1}^{Nl} (Tl_i \times Il_i) - \sum Tl_i \times \sum Il_i \qquad (7)$$

When a partial image is masked and the number of pixels is Nk (121−49=72), $$Ak = Nk \sum_{i=1}^{Nk}(Tk_i \times Ik_i) - \sum Tk_i \times \sum Ik_i \quad (8)$$

$$= (Nl - Nm)\left\{\sum_{i=1}^{Nl}(Tl_i \times Il_i) - \sum_{i=1}^{Nm}(Tm_i \times Im_i)\right\} -$$

$$\left(\sum Tl_i - \sum Tm_i\right) \times \left(\sum Il_i - \sum Im_i\right)$$

Sigma calculation values used in calculating Ak have been already calculated when calculating Am and Al, and therefore it is unnecessary to newly calculate the sigma calculation values. B of the equation (4) and C of the equation (5) can be calculated in the same manner.

Table 2 shows whether the partial image thus obtained matches a self-rotated image obtained by rotating the partial image by 180 degrees or not. In Table 2, ○ indicates a pattern determined as matching between a partial image and a self-rotated image thereof, and x indicates a pattern determined as not matching between a partial image and a self-rotated image thereof.

TABLE 2

|  | Pattern A | Pattern B | Pattern C |
|---|---|---|---|
| 7 × 7 | ○ | X | ○ |
| 11 × 11 | X | X | ○ |
| masked | X | ○ | ○ |

As shown in Table 2, results of determining whether a partial image matches a self-rotated image thereof or not varies depending on the size with which the partial image is cut out or on whether a masked partial image exists or not. Therefore, by calculating a matching test with respect to plural cutting-out methods, patterns that are different with respect to each cutting-out method can be extracted as patterns matching between a partial image and self-rotated image thereof.

For example, target pixels of patterns determined as matching between a partial image and a self-rotated image thereof through plural cutting-out methods may be regarded as feature points, or a target pixel of a pattern determined as matching between a partial image and a self-rotated image thereof through any one of plural cutting-out methods may be regarded as a feature point, or a target pixel of a pattern determined as matching between a partial image and a self-rotated image thereof through more than the predetermined number of methods out of plural cutting-out methods may be regarded as a feature point.

As described above, by extracting feature points with use of results of determining whether a pattern matches between a partial image and a self-rotated image thereof through plural cutting-out methods, the number of extracted feature points can be easily increased. This allows determining a similarity between an input image and a reference image in accordance with more number of feature points, thereby further increasing accuracy in similarity determination.

In the present embodiment, an explanation was made as to a case where the feature point calculation section 31 extracts a feature point in accordance with image data of a multivalue image input from the pre-process section 30. However, a method for extracting a feature point is not limited to this.

For example, the present invention may be arranged so that the pre-process section 30 performs a binarization process and a feature point is extracted in accordance with a binarized image.

In this case, the pre-process section 30 binarizes image data by comparing achromatized image data (luminance value (luminance signal) or brightness value (brightness signal)) with a predetermined threshold value.

Then, the pattern detection process section 45 of the feature point calculation section 31 extracts a partial image out of the image data binarized by the pre-process section 30, counts the number of ON pixels (number of black pixels) CountOn, and determines whether a pattern exists or not according to whether the number of counts is within a predetermined range or not. For example, threshold values TH2 and TH3 are preset, and when TH2≦CountOn≦TH3, it is determined that a pattern exists, and when TH2>CountOn or when CountOn>TH3, it is determined that a pattern does not exist. The threshold values TH2 and TH3 may be set suitably so that a pattern is extracted suitably.

The rotated image generating section 46 generates a self-rotated image by rotating by a predetermined self-rotation angle R the partial image determined as having a pattern by the pattern detection process section 45. At that time, a rotation process may be performed after a float calculation for rounding decimals.

Thereafter, the matching test calculation section 47 counts the number of matching Sn between a pixel value of the partial image (image before being rotated) and a pixel value of the self-rotated image.

Figure 17:
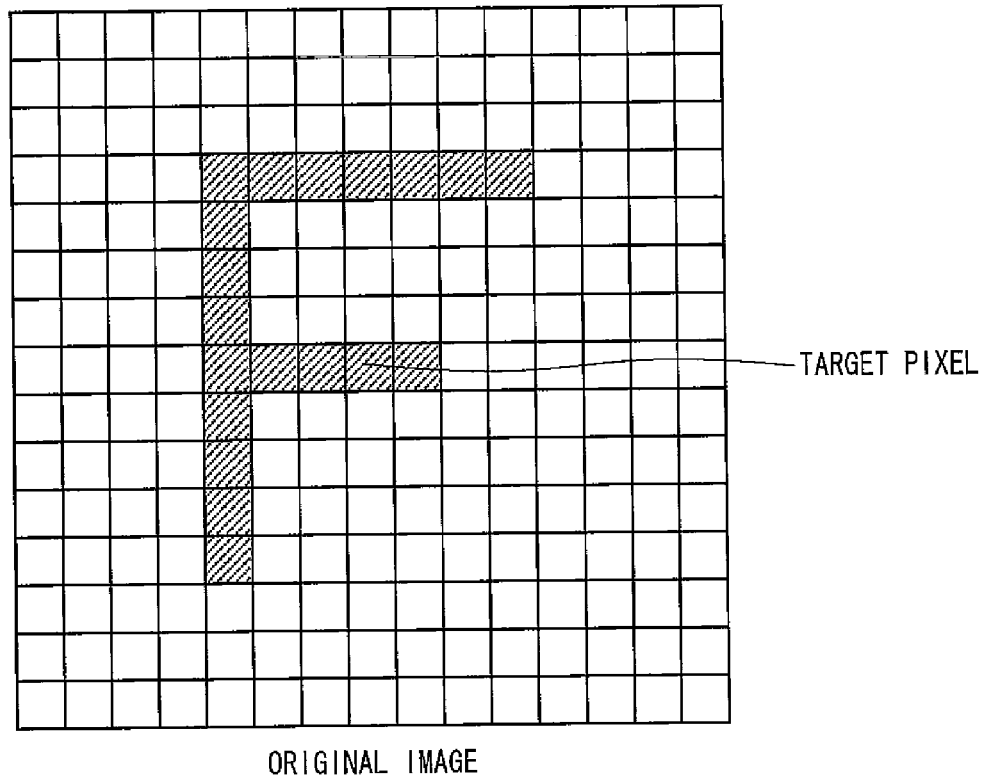
FIG. 17($a$) is an explanatory drawing illustrating an example of a partial image extracted from binary image data.
Figure 17:
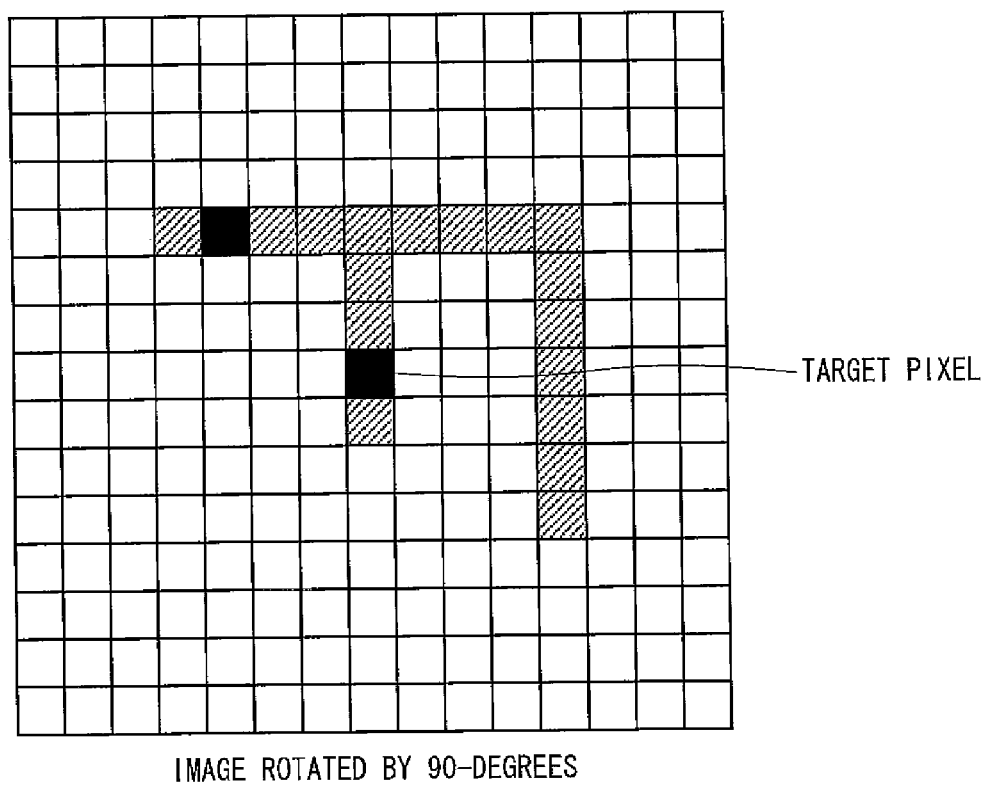

FIG. 17(a) is an explanatory drawing illustrating an example of a partial image. FIG. 17(b) is an explanatory drawing illustrating a self-rotated image of the partial image illustrated in FIG. 17(a). In the example of FIGS. 17(a) and 17(b), a pixel having the same pixel value between the partial image and the self-rotated image is a blackened pixel (line 5, column 5 and line 8, column 8) in FIG. 17(b). Consequently, in the example, the number of pixels having the same pixel value between the partial image and the self-rotated image is "Sn=2."

Thereafter, the matching test determination section 48 compares the number of matching Sn counted by the matching test calculation section 47 with a predetermined threshold value TH_est2 so as to determine whether the partial image matches the self-rotated image or not. For example, when Sn>TH_est2 the matching test determination section 48 determines that the partial image matches the self-rotated image, and when Sn≦TH_est2, the matching test determination section 48 determines that the partial image does not match the self-rotated image. The threshold value TH_est2 may be suitably set so that a feature point is extracted suitably.

Further, the present invention may be arranged so as to calculate a residual difference Sz that is a sum of absolute values of differences in pixel value between a pixel of a partial image and a corresponding pixel of a self-rotated image, and to calculate a feature point in accordance with the residual difference Sz.

In this case, the pattern detection process section 45 and the rotated image generating section 46 perform the same processes as described above. As represented by equation below, the matching test calculation section 47 calculates a sum (residual difference Sz) of absolute values of differences in pixel value between a pixel of a partial image and a corresponding pixel of a self-rotated image. Image data to be input to the pattern detection process section 45 may be binary data or multivalent data.

$$S_Z = \sum_{i=1}^{N} (|I_i - T_i|) \quad (9)$$

Thereafter, the matching test determination section 48 compares the residual difference Sz calculated by the matching test calculation section 48 with a predetermined threshold value TH_est3 so as to determine whether a partial image matches a self-rotated image thereof or not. Note that as the residual difference Sz is smaller, a matching test between the partial image and the self-rotated image is higher. Therefore, for example, when Sz<TH_est3, it is determined that the partial image matches the self-rotated image, and when Sz≧TH_est3, it is determined that the partial image does not match the self-rotated image. The threshold value TH_est3 may be set suitably so that a feature point is extracted suitably.

In the present embodiment, an explanation was made as to a case where input image data is a 1-channel multivalent signal and similarity determination is performed with use of a binary signal obtained by binarizing the input image data. However, the arrangement of input image data is not limited to this. For example, input image data may be a color signal having plural channels (e.g. three channels of R, G, and B or four channels of C, M, Y, and K) or data obtained by combining the color signal with a signal by a light source for emitting invisible light. In this case, the process by the signal conversion process section 41 in the pre-process section 30 is not performed. Whether the process by the signal conversion process section 41 is to be performed or not may be determined according to an instruction to select a color image, which is input by a user via the operation panel 6 of the image forming apparatus 3 (when the user selects "color image" out of selection between "color image" and "monochrome image" presented as the kinds of documents), or according to the result of determination by an automatic color selecting section (not shown), provided in a stage previous to the document matching process section 13, for determining whether a document image (input image data) is a color image or not.

An example of a method for automatic color selection is a method disclosed in Patent Document 3 (Japanese Unexamined Patent Publication No. Tokukaihei 4-282968 (published on Oct. 8, 1992)). In the method, whether a pixel is a color pixel or a monochrome pixel is determined with respect to each pixel. When a predetermined number or more of continuous color pixels are detected, the continuous color pixels are regarded as a color block, and when a predetermined number or more of color blocks are detected in one line, the line is regarded as a color line. When a predetermined number of color lines exist in a document, the document is regarded as a color image, and when a predetermined number of color lines do not exist in the document, the document is regarded as a monochrome image.

For example, in a case where a color image input signal is a general three-channel signal of R, G, and B, each channel is processed as an independent multivalent signal by the pre-process section 30, or the three-channel signal is subjected to a binarization process as described above, so that a feature point can be extracted with respect to each channel as with the aforementioned embodiments.

Figure 27:
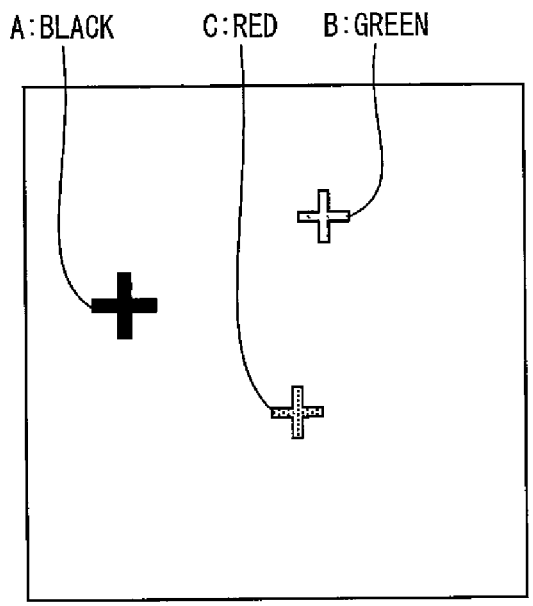
FIG. 27($a$) is an explanatory drawing illustrating an example of input image data indicative of a color image.
Figure 27:
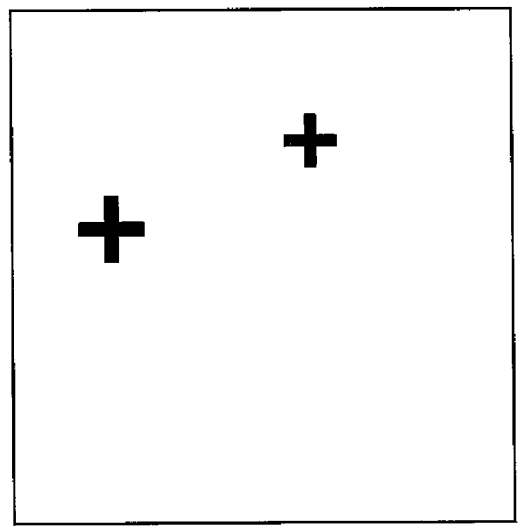
Figure 27:
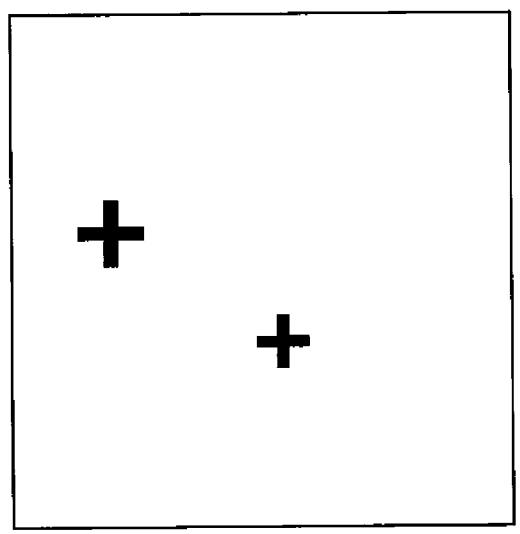
Figure 27:
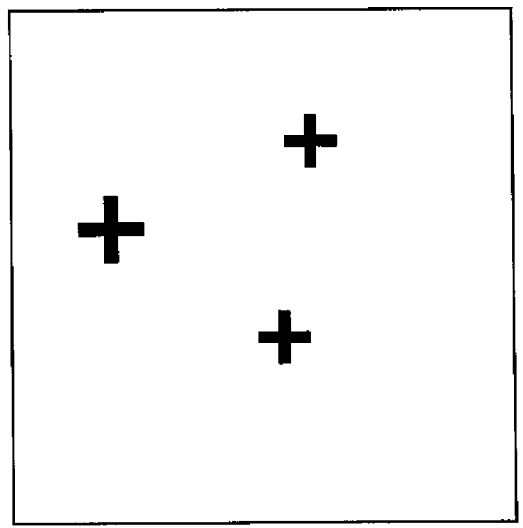

FIG. 27(*a*) is an explanatory drawing illustrating an example of input image data indicative of a color image. FIGS. 27(*b*) to 27(*d*) are explanatory drawings illustrating multivalent image data of R channel, G channel, and B channel, respectively, corresponding to the image data in FIG. 27(*a*). As illustrated in FIGS. 27(*b*) to 27(*d*), the position of an extracted feature point is different with respect to each channel. Table 3 shows results of extracting feature points based on images of respective channels (FIGS. 27(*b*) to 27(*d*)) corresponding to three marks with different colors (A: black, B: green, and C: red) illustrated in FIG. 31(*a*). In Table 3, ○ indicates a pattern determined as a feature point, and x indicates a pattern not determined as a feature point.

TABLE 3

|            | R channel | G channel | B channel |
|------------|-----------|-----------|-----------|
| A (black)  | ○         | ○         | ○         |
| B (green)  | ○         | X         | ○         |
| C (red)    | X         | ○         | ○         |

As shown in Table 3, a partial image from which a feature point is extracted is different with respect to each channel. Consequently, a feature point extracted in accordance with the partial image and its self-rotated image is different with respect to each channel. Therefore, by extracting a feature point with use of plural channels, more number of feature points can be extracted.

For example, feature points extracted in individual channels may be regarded as individual feature points, or a target pixel of a pattern determined as matching between a partial image and a self-rotated image in any one of plural channels may be regarded as a feature point, or target pixels of patterns determined as matching between partial images and self-rotated images in a predetermined number of channels out of plural channels may be regarded as individual feature points.

As described above, by extracting a feature point in accordance with the result of determining whether a partial image matches a self-rotated image in plural channels, it is possible to easily increase the number of feature points or the number of information related to the feature points. Consequently, a similarity between an input image and a reference image is determined in accordance with more number of feature points, thereby further increasing accuracy in similarity determination.

In the present embodiment, an explanation was made as to a case where the present invention is applied to the digital color multi-function printer 1. However, the present invention is not limited to this case. For example, the present invention may be applied to a monochrome multi-function printer. Alternatively, the present invention may be applied to a single-function apparatus such as a facsimile communication apparatus, a copier, and an image reading apparatus.

Figure 18:
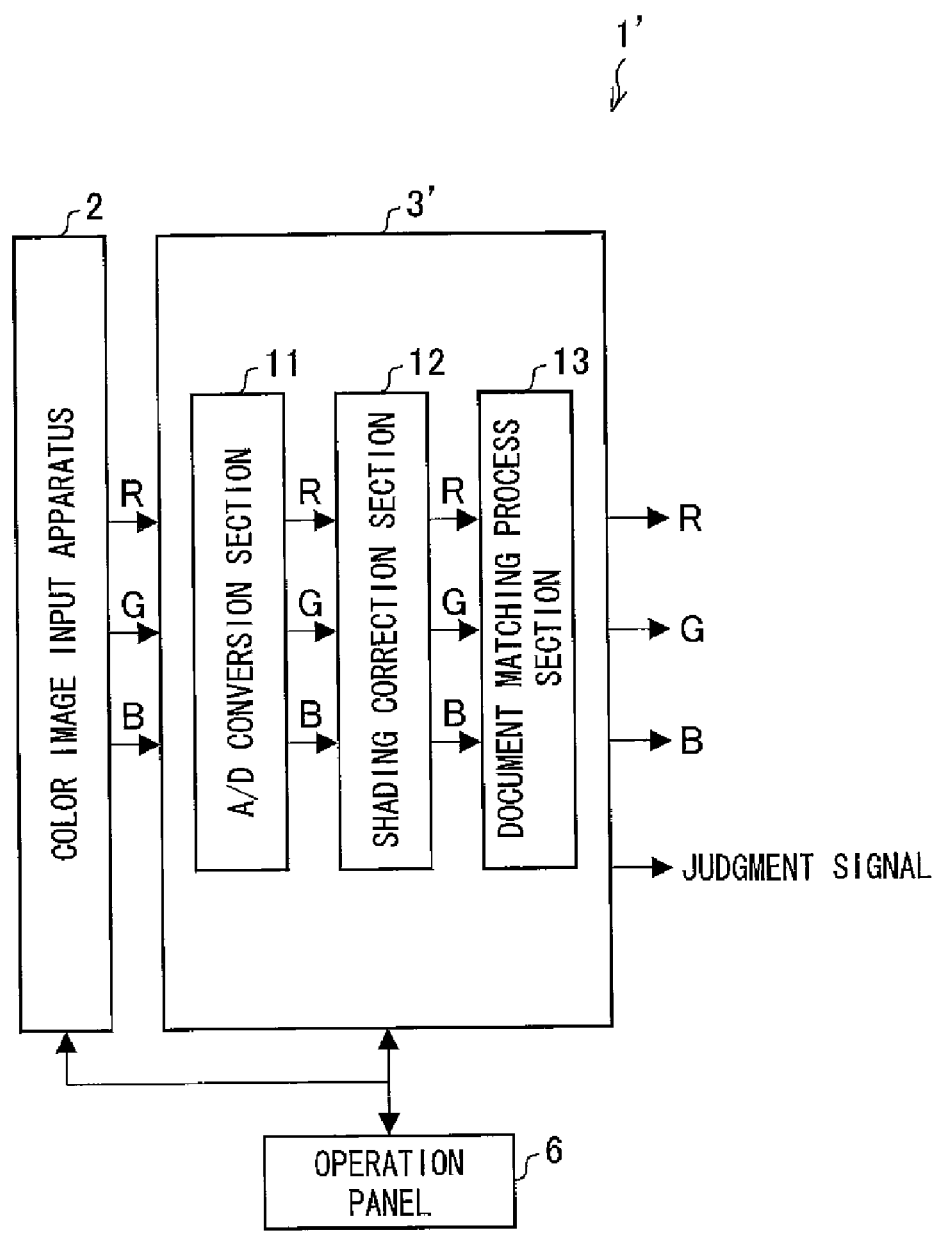
FIG. 18 is a block diagram illustrating a modification example of an image processing apparatus in accordance with an embodiment of the present invention.

FIG. 18 is a block diagram illustrating an example of an arrangement in which the present invention is applied to a flat bed scanner (image reading apparatus, image processing apparatus) 1'.

As illustrated in FIG. 18, the flat bed scanner 1' includes a color image input apparatus 2 and a color image processing apparatus 3'. The color image processing apparatus 3' includes an A/D conversion section 11, a shading correction section 12, a document matching process section 13, a control section 7 (not shown in FIG. 18), and a memory 8 (not shown in FIG. 18). The color image input apparatus 2 is connected with the color image processing apparatus 3', and the color image input apparatus 2 and the color image processing apparatus 3' constitute the image reading apparatus 1', as a whole. Functions of the A/D conversion section 11, the shading correction section 12, the document matching process section 13, the control section 7, and the memory 8 included in the image reading apparatus 1' are substantially the same as those of the members in the digital color multi-function printer 1 as described above and therefore explanations thereof are omitted here.

Figure 19:
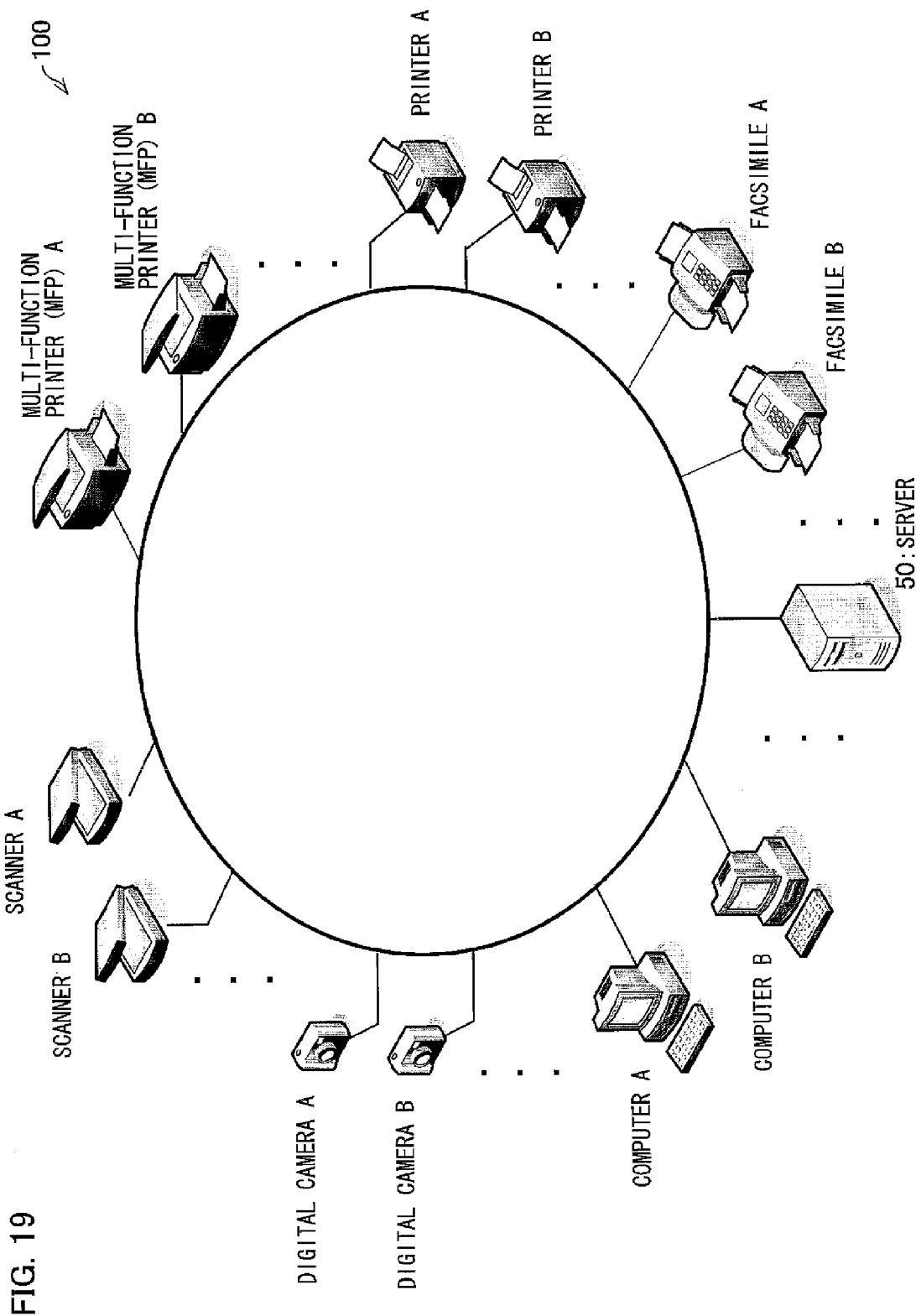
FIG. 19 is an explanatory drawing illustrating an arrangement of an image processing system in accordance with one embodiment of the present invention.

The function of the document matching process section 13 may be realized by an image processing system including the image processing apparatus and a server communicably connected with the image processing apparatus. FIG. 19 is an explanatory drawing illustrating an arrangement of an image processing system 100 that includes an image processing apparatus (multi-function printers (MFPs) A, B, . . . ; printers A, B, . . . , facsimiles A, B, . . . ; computers A, B, . . . ; digital cameras A, B, . . . , scanners A, B, . . . ) and a server 50 communicably connected with the image processing apparatus. The arrangement of the image processing system 100 is not limited to this. For example, the image processing system 100 may include the server 50 and at least one of a multi-function printer, a printer (image forming apparatus), a facsimile, a computer, a digital camera (image reading apparatus), and a scanner (image reading apparatus).

The scanner includes a scanner platen, an optical scanning section, CCD (charge coupled device) etc. The scanner scans a document image on the scanner platen with use of the optical scanning section, thereby reading the document image and generating image data. The digital camera includes an image-capture lens, a CCD (image input device) etc. The digital camera captures a document image, a person image, a landscape image etc. and generates image data. The scanner and the digital camera may have a function for performing a predetermined image process (such as various correction processes) in order to reproduce an image suitably. The printer prints on a sheet (recording paper) an image according to image data generated by the computer, the scanner, and the digital camera. The facsimile performs a process such as a binary process, a resolution conversion process, and a rotation process on image data supplied from the image input apparatus to obtain image data encoded into a predetermined format and sends the image data to the other end, or the facsimile receives image data from the other end, decodes the image data, performs a rotation process, a resolution conversion process, and a halftone process on the image data in accordance with performance of an image output apparatus, and outputs the image data as an image per page. The multi-function printer includes at least two functions out of a scanner function, a facsimile transmission function, and a printing function (copy function, printer function). The computer edits image data read by the scanner and the digital camera, or generates a document with use of application software.

In the image processing system 100, sections of the document matching process section 13 are divided into the server 50 and the image processing apparatus connected with the server 50 via a network. The image processing apparatus and the server 50 cooperate to realize the function of the document matching process section 13.

Figure 20:
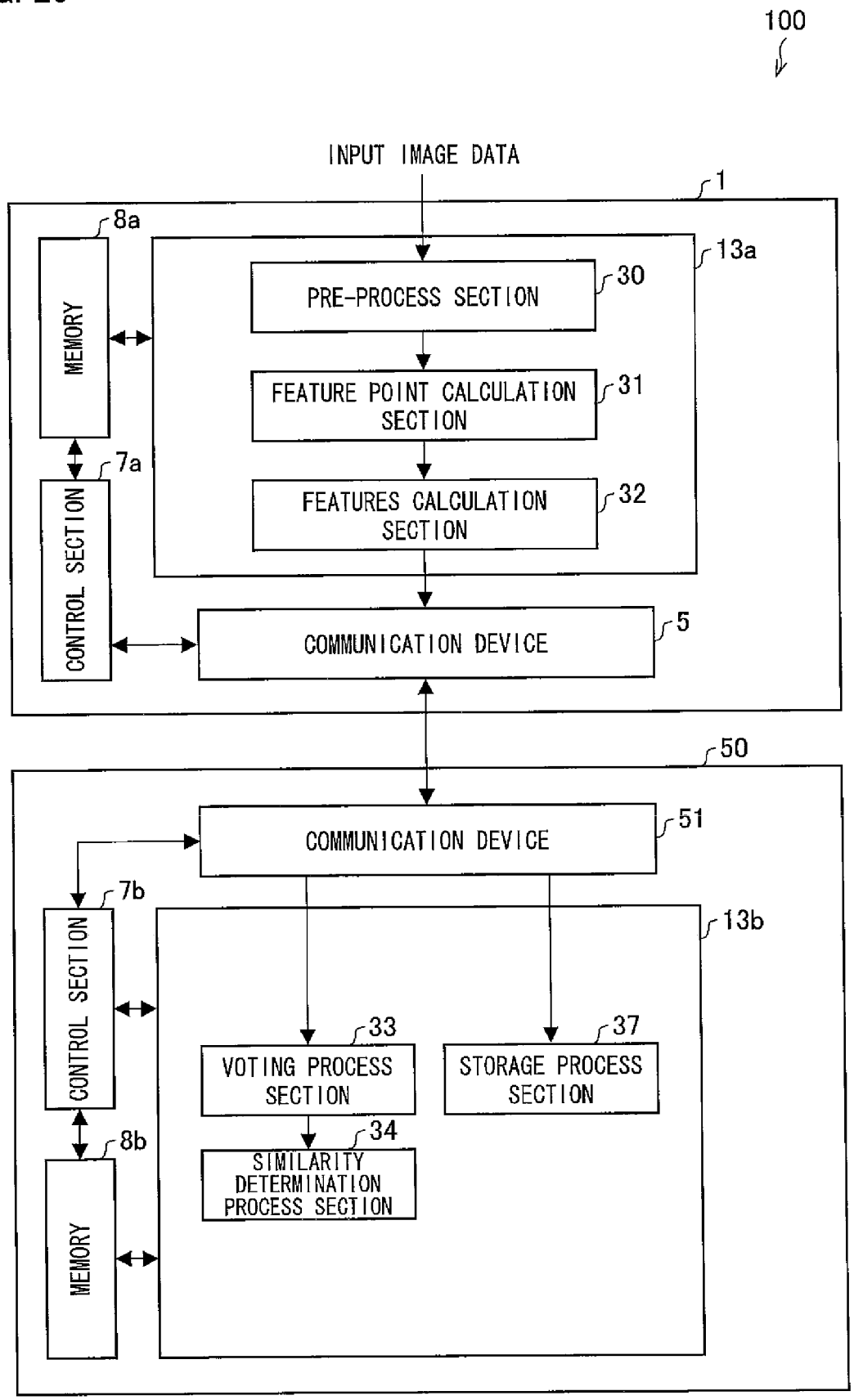
FIG. 20 is a block diagram illustrating an example of an arrangement of an image processing system in accordance with an embodiment of the present invention.

FIG. 20 is a block diagram illustrating an example of an arrangement in which the function of the document matching process section 13 is divided into the server 50 and the digital color multi-function printer 1.

As illustrated in FIG. 20, the color image processing apparatus 3 of the digital color multi-function printer 1 includes: a pre-process section 30; a document matching process section 13a including a feature point calculation section 31 and a features calculation section 32; a control section 7a for controlling the operation of the document matching process section 13a; a memory 8a in which information necessary for the process of the document matching process section 13a is stored; and a communication device 5 for communicating with an external device. The server 50 includes: a communication device 51 for communicating with an external device; a document matching process section 13b including a voting process section 33, a similarity determination process section 34, and a storage process section 37; a control section 7b for controlling the document matching process section 13b; and a memory 8b in which information necessary for the process of the document matching process section 13b is stored. In a case where transmission/reception of data is required between functional blocks of the digital color multi-function printer 1 and functional blocks of the server 50, the control sections 7a and 7b control the communication devices 5 and 51, respectively, so that transmission/reception of data is performed suitably. Other functions are the same as those already explained above.

Figure 21:
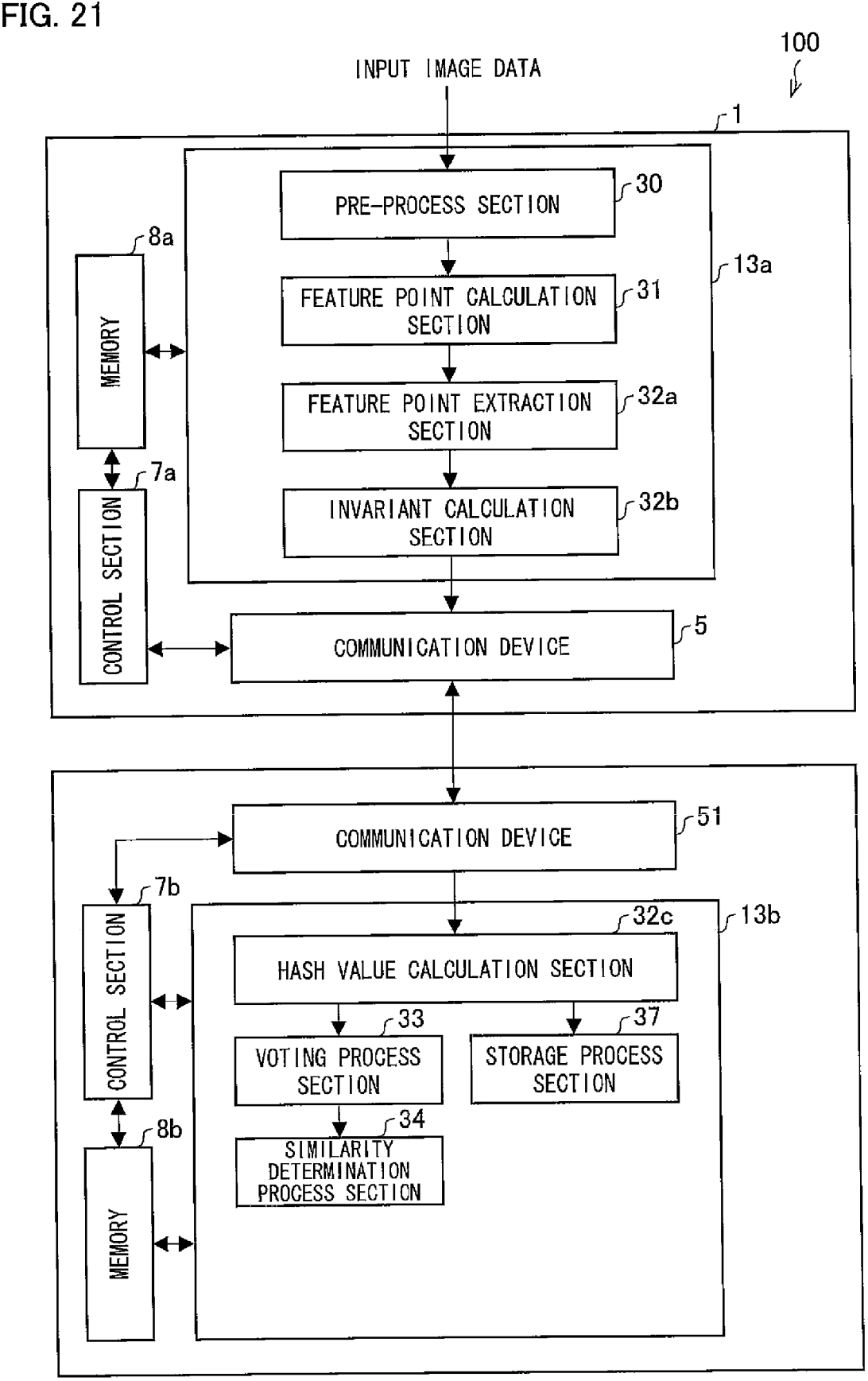
FIG. 21 is a block diagram illustrating another example of an arrangement of an image processing system in accordance with an embodiment of the present invention.
Figure 22:
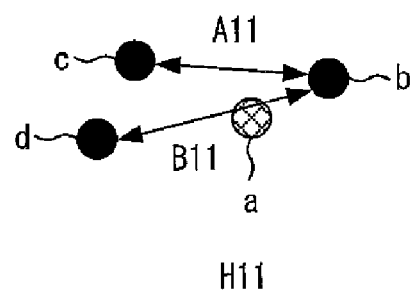
FIGS. 22($a$) to 22($d$) are explanatory drawings each illustrating an example of a combination of a target feature point and peripheral feature points that are extracted at a time when the features calculation section in the image processing apparatus in accordance with an embodiment of the present invention calculates features.
Figure 22:
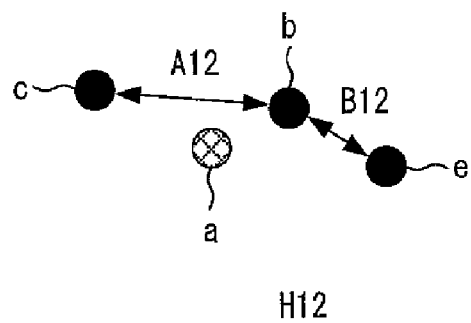
Figure 22:
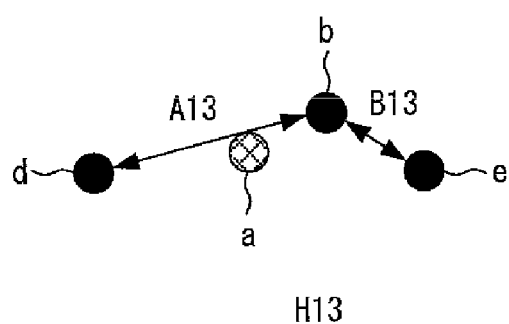
Figure 22:
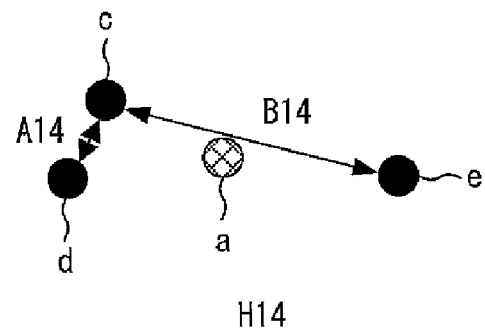
Figure 23:
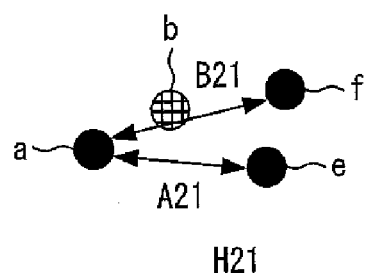
FIGS. 23($a$) to 23($d$) are explanatory drawings each illustrating an example of a combination of a target feature point and peripheral feature points that are extracted at a time when the features calculation section in the image processing apparatus in accordance with an embodiment of the present invention calculates features.
Figure 23:
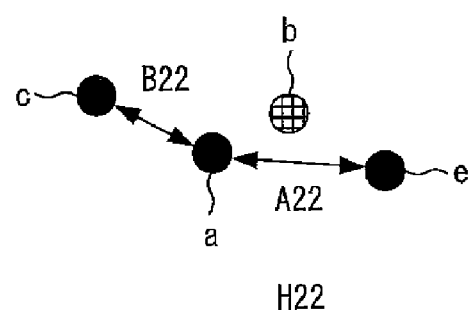
Figure 23:
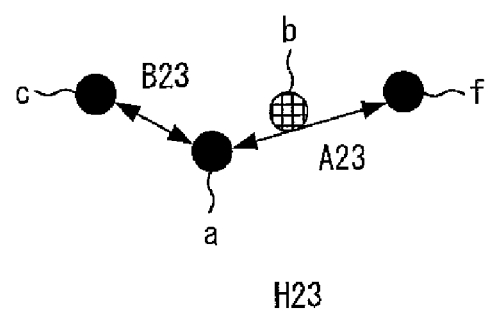
Figure 23:
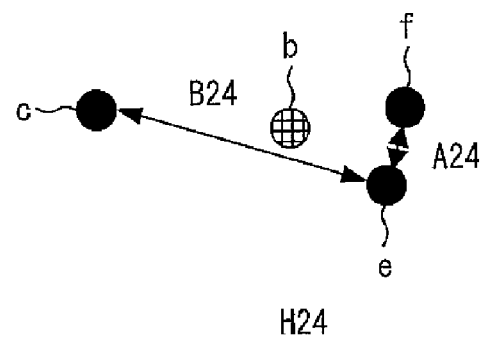

In the example of FIG. 20, all members of the features calculation section 32 (feature point extracting section 32a, invariant calculation section 32b, and hash value calculation section 32c) are included in the digital color multi-function printer 1. Alternatively, the present invention may be arranged so that, as illustrated in FIG. 21, the feature point extracting section 32a and the invariant calculation section 32b are provided in the digital color multi-function printer 1 whereas the hash value calculation section 32c is provided in the server 50.

Alternatively, the present invention may be arranged so that members of the features calculation section 32 are provided in the server 50, data indicative of a feature point calculated by the feature point calculation section 31 is transmitted from the digital color multi-function printer 1 to the server 50, and the features calculation section 32 provided in the server 50 calculates a hash value based on the hash table 103 stored in the memory 8b and the received data indicative of the feature point. Alternatively, the present invention may be arranged so that members of the feature point calculation section 31 and the features calculation section 32 are provided in the server 50, input image data is transmitted from the digital color multi-function printer 1 to the server 50, and the feature point calculation section 31 and the features calculation section 32 provided in the server 50 calculate a hash value based on the input image data received from the server 50 and the hash table 103 stored in the memory 8b.

An explanation was made above as to a case where a similarity determination process is performed. In a case where a storage process is performed, the storage process section 37 included in the server 50 causes (i) document ID received from the digital color multi-function printer 1 and (ii) a hash value received from the digital color multi-function printer 1 (or hash value calculated by the hash value calculation section 32c included in the server 50) to be stored in a hash table provided in the memory 8b. Whether to perform the similarity determination process or the storage process may be designated by a user of the digital color multi-function printer 1 via the operation panel 6 so that a signal indicative of the designated process is transmitted to the server 50. Alternatively, the server 50 performs the storage process with respect to an input image determined as having no similarity as a result of the similarity determination process.

In a case where the hash value calculation section 32c is included in the server 50, the present invention may be arranged so that a hash value is calculated through a method different from the method used in calculating hash values stored in the hash table (i.e. using other hash function), and the hash table 103 is updated using the calculated hash value. With the arrangement, it is possible to store in the hash table a suitable hash value obtained by referring to features (invariant) according to the kind etc. of a document image (i.e. it is possible to update the hash table 103), and the voting process can be performed with use of the updated hash value. This allows increasing matching accuracy (accuracy in similarity determination).

Each section (each block) constituting the document matching process section and the control section included in the digital color multi-function printer 1 and/or the server 50 may be realized by software by using a processor such as a CPU. Namely, the digital color multi-function printer 1 and/or the server 50 include: a CPU (central processing unit) for executing a program for realizing each function; a ROM (read only memory) that stores the program; a RAM (random access memory) that develops the program; a storage device (storage medium) such as a memory in which the program and various data are stored; and the like. The object of the present invention can be realized in such a manner that the digital color multi-function printer 1 and/or the server 50 are provided with a computer-readable storage medium for storing program codes (such as executable program, intermediate code program, and source program) of programs of the digital color multi-function printer 1 and/or the server 50 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy disco and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the digital color multi-function printer 1 and/or the server 50 may be arranged so as to be connectable to a communication network so that the program code is supplied to the digital color multi-function printer 1 and/or the server 50 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Furthermore, each block of the digital color multi-function printer 1 and/or the server 50 may be realized by hardware logic. Each block of the digital color multi-function printer 1 and/or the server 50 may be a combination of hardware carrying out some of the processes and the computing means controlling the hardware and executing program code for the other processes.

The computer system of the present invention may be composed of: an image input apparatus such as a flat bed scanner, a film scanner, and a digital camera; a computer loaded with a predetermined program to execute processes such as the similarity calculation process and the similarity determination process; an image display apparatus, such as a CRT display and a liquid crystal display, for displaying a result of the process by the computer; and an image forming apparatus, such as a printer, for outputting a result of the process by the computer on a paper etc. Furthermore, a network card or a modem may be provided as communication means to be connected with a server etc. via a network.

As described above, the image processing apparatus of the present invention includes: a feature point detection section for detecting feature points included in input image data; and a features calculation section for calculating features of the input image data in accordance with relative positions of the feature points detected by the feature point detection section, the feature point detection section including: a partial image extraction section for extracting, from the input image data, a partial image made of a plurality of pixels including a target pixel; a rotated image generating section for generating a self-rotated image by rotating the partial image by a predetermined angle; a matching test determination section for determining whether an image pattern included in the partial image matches an image pattern included in the self-rotated image or not, when the partial image is caused to overlap the self-rotated image; and a detection section for detecting, as each of the feature points, (a) a target pixel in the partial image including the image pattern determined by the matching test determination section as matching the image pattern included in the self-rotated image, or (b) a block made of a plurality of pixels including the target pixel.

With the arrangement, the partial image extraction section extracts, from the input image data, a partial image made of a plurality of pixels including a target pixel, the rotated image generating section generates a self-rotated image by rotating the partial image by a predetermined angle, and the matching test determination section determines whether an image pattern included in the partial image matches an image pattern included in the self-rotated image or not, when the partial image is caused to overlap the self-rotated image. That is, the matching test determination section determines, when a partial image is caused to overlap an image obtained by rotating the partial image by a predetermined angle, whether image patterns included in the both images match each other. And the detection section detects, as each of the feature points, (a) a target pixel in the partial image including the image pattern determined by the matching test determination section as matching the image pattern included in the self-rotated image, or (b) a block made of a plurality of pixels including the target pixel.

Consequently, even when input image data is data that is read while being skewed with respect to a predetermined positioning angle of a reading position of an image reading apparatus or even when input image data is subjected to a process such as enlarging and reducing, it is possible to detect, as a feature point, a target pixel of a partial image including an image pattern that is not or little influenced by the skew, the enlarging, the reducing, etc. or a block including the target pixel. Therefore, by calculating features of input image data in accordance with relative positions of the feature points, it is possible to obtain features that allows accurately specifying the input image data regardless of the skew, the enlarging, the reducing, etc.

Further, the image processing apparatus of the present invention may be arranged so as to further include: at least one of a storage section in which features of a reference image are stored and a reference image obtaining section for obtaining the features of the reference image from an external apparatus communicably connected with the image processing apparatus; and a similarity calculation section for comparing the features of the input image data that are calculated by the features calculation section with the features of the reference image so as to calculate a similarity between the input image data and the reference image.

With the arrangement, even in a case of image data having been read while being skewed with respect to a predetermined positioning angle of a reading position of an image reading apparatus or even in a case of image data having been subjected to a process such as enlarging and reducing, it is possible to calculate a similarity between an input image and a reference image with high accuracy.

Further, the image processing apparatus of the present invention may be arranged so as to further include: a storage section in which features of image data and identification information for identifying image data are stored; and a storage process section for causing the features of the input image data that are calculated by the features calculation section and identification information for identifying the input image data to be stored in the storage section in such a manner that the features are related to the identification information.

With the arrangement, even when input image data has been read while being skewed with respect to a predetermined positioning angle of a reading position of an image reading apparatus or even when input image data has been subjected to a process such as enlarging and reducing, it is possible to calculate features that allow accurately specifying the input image data, and to cause the features and the input image data to be stored in the storage section.

Further, the image processing apparatus of the present invention may be arranged so as to further include a pattern detection process section for determining whether the partial image includes an image pattern or not, the rotated image generating section generating the self-rotated image with respect to a partial image determined by the pattern detection process section as including an image pattern.

With the arrangement, the pattern detection process section determines whether the partial image includes an image pattern or not, and the rotated image generating section generates the self-rotated image with respect to a partial image determined by the pattern detection process section as including an image pattern. Consequently, generation of a self-rotated image and similarity determination are not performed with respect to a partial image that does not include an image pattern. This results in simpler processes.

The image processing apparatus of the present invention may be arranged so that the rotated image generating section generates a plurality of self-rotated images with respect to each partial image by rotating each partial image by different rotation angles, the matching test determination section determines whether the partial image matches each of the plurality of self-rotated images, and when the partial image matches at least one of the plurality of self-rotated images, the detection section detects, as each of the feature points, a target pixel in the partial image or a block made of a plurality of pixels including the target pixel.

With the arrangement, more number of feature points are extracted compared with a case where only one kind of a self-rotated image is generated with respect to each partial image. Further, at least an extraction process for a partial image and a similarity determination process for the partial image are performed with use of an algorithm or with a process circuit that is common among the self-rotated images, and therefore it is possible to extract more number of feature points without requiring more complex algorithm and more larger process circuit.

Further, the image processing apparatus of the present invention may be arranged so that the partial image extraction section extracts plural kinds of partial images by differentiating a size of an area to be extracted as a partial image.

Differentiating the size of an area to be extracted as a partial image results in different results of extracting partial images. Therefore, with the arrangement, by extracting plural kinds of partial images corresponding to different sizes of areas to be extracted as partial images, it is possible to increase the number of extracted feature points. Consequently, a similarity between an input image and a reference image is determined in accordance with more number of feature points, which further increases accuracy in similarity determination.

Further, the image processing apparatus of the present invention may be arranged so that the partial image extraction section performs a first extraction process for extracting a partial image while setting a size of an area to be extracted as the partial image to be a first size, and a second extraction process for extracting a partial image while setting a size of an area to be extracted as the partial image to be a second size larger than the first size, and in the second extraction process, the partial image is extracted after excluding the area with the first size from the area with the second size in such a manner that the area with the first size and the area with the second size center an identical target pixel.

With the arrangement, it is possible to extract more number of feature points, which further increases accuracy in similarity determination.

Further, the image processing apparatus of the present invention may be arranged so that the partial image extraction section extracts a partial image with respect to each of a plurality of color components of input image data.

With use of different color components of single input image data, different partial images are extracted. Therefore, with the arrangement, by extracting a partial image with respect to each of different color components, it is possible to increase the number of extracted feature points. Consequently, a similarity between an input image and a reference image is determined in accordance with more number of feature points, which further increases accuracy in similarity determination.

Further, the image processing apparatus of the present invention may be arranged so as to further include a smoothing process section for performing a smoothing process on input image data, the feature point detection section detecting the feature points from the input image data subjected to the smoothing process.

With the arrangement, feature points are detected from input image data subjected to the smoothing process. This allows preventing extraction of inappropriate features due to halftone dots and noise components.

The image forming apparatus of the present invention includes one of the aforementioned image processing apparatuses and an image output section for forming an image corresponding to input image data on a recording material.

With the arrangement, even when input image data has been read while being skewed with respect to a predetermined positioning angle of a reading position of an image reading apparatus or even when input image data has been subjected to a process such as enlarging and reducing, it is possible to calculate features that allow accurately specifying the input image data regardless of the skew, the enlarging, the reducing etc.

The image processing system of the present invention includes an image processing apparatus and a server communicably connected with the image processing apparatus, one of the image processing apparatus and the server including a feature point detection section for detecting feature points included in input image data and a features calculation section for calculating features of the input image data in accordance with relative positions of the feature points detected by the feature point detection section, or the feature point detection section and the features calculation section being divided into the image processing apparatus and the server, the feature point detection section including: a partial image extraction section for extracting, from the input image data, a partial image made of a plurality of pixels including a target pixel; a rotated image generating section for generating a self-rotated image by rotating the partial image by a predetermined angle; a matching test determination section for determining whether an image pattern included in the partial image matches an image pattern included in the self-rotated image or not, when the partial image is caused to overlap the self-rotated image; and a detection section for detecting, as each of the feature points, (a) a target pixel in the partial image including the image pattern determined by the matching test determination section as matching the image pattern included in the self-rotated image, or (b) a block made of a plurality of pixels including the target pixel.

With the arrangement, the partial image extraction section extracts, from the input image data, a partial image made of a plurality of pixels including a target pixel, the rotated image generating section generates a self-rotated image by rotating the partial image by a predetermined angle, the matching test determination section determines whether an image pattern included in the partial image matches an image pattern included in the self-rotated image or not when the partial image is caused to overlap the self-rotated image, and the detection section detects, as each of the feature points, (a) a target pixel in the partial image including the image pattern determined by the matching test determination section as matching the image pattern included in the self-rotated image, or (b) a block made of a plurality of pixels including the target pixel.

Consequently, even when input image data has been read while being skewed with respect to a predetermined positioning angle of a reading position of an image reading apparatus or even when input image data has been subjected to a process such as enlarging and reducing, it is possible to detect, as a feature point, a target pixel of a partial image including an image pattern that is not or little influenced by the skew, the enlarging, the reducing etc. or a block including the target pixel. Therefore, by calculating features of input image data in accordance with relative positions of the feature points, it is possible to obtain features that allows accurately specifying input image data regardless of the skew, the enlarging, the reducing etc.

The image processing method of the present invention includes the steps of: (I) detecting feature points included in input image data; and (II) calculating features of the input image data in accordance with relative positions of the feature points detected in the step (I), the step (I) including the substeps of: (i) extracting, from the input image data, a partial image made of a plurality of pixels including a target pixel; (ii) generating a self-rotated image by rotating the partial image by a predetermined angle; (iii) determining whether an image pattern included in the partial image matches an image pattern included in the self-rotated image or not, when the partial image is caused to overlap the self-rotated image; and (iv) detecting, as each of the feature points, (a) a target pixel in the partial image including the image pattern determined in the substep (iii) as matching the image pattern included in the self-rotated image, or (b) a block made of a plurality of pixels including the target pixel.

With the arrangement, in the substep (i), a partial image made of a plurality of pixels including a target pixel is extracted from input image data. In the substep (ii), a self-rotated image is generated by rotating the partial image by a predetermined angle. In the substep (iii), it is determined whether an image pattern included in the partial image matches an image pattern included in the self-rotated image or not, when the partial image is caused to overlap the self-rotated image. In the step (iv), (a) a target pixel in the partial image including the image pattern determined in the substep (iii) as matching the image pattern included in the self-rotated image, or (b) a block made of a plurality of pixels including the target pixel, is detected as each of the feature points.

Consequently, even when input image data has been read while being skewed with respect to a predetermined positioning angle of a reading position of an image reading apparatus or even when input image data has been subjected to a process such as enlarging and reducing, it is possible to detect, as a feature point, a target pixel of a partial image including an image pattern that is not or little influenced by the skew, the enlarging, the reducing etc. or a block including the target pixel. Therefore, by calculating features of input image data in accordance with relative positions of the feature points, it is possible to obtain features that allows accurately specifying input image data regardless of the skew, the enlarging, the reducing etc.

The image processing apparatus may be realized by a computer. In this case, the present invention also includes: an image processing program for causing a computer to operate as each of the above sections so as to realize the image processing apparatus by use of the computer; and a computer-readable storage medium in which the program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus, comprising:
   a feature point detection section for detecting feature points included in input image data; and
   a features calculation section for calculating features of the input image data in accordance with relative positions of the feature points detected by the feature point detection section,
   the feature point detection section including:
   a partial image extraction section for extracting, from the input image data, a partial image made of a plurality of pixels including a target pixel, an index for indicating busyness of the partial image being not less than a predetermined threshold value;
   a rotated image generating section for generating a self-rotated image by rotating the partial image which has been extracted by the partial image extraction section by a predetermined angle;
   a matching test determination section for determining whether an image pattern included in the partial image matches an image pattern included in the self-rotated image or not, when the partial image is caused to overlap the self-rotated image; and
   a detection section for detecting, as each of the feature points, (a) a target pixel in the partial image including the image pattern determined by the matching test determination section as matching the image pattern included in the self-rotated image, or (b) a block made of a plurality of pixels including the target pixel.

2. The image processing apparatus as set forth in claim 1, further comprising:
   at least one of a storage section in which features of a reference image are stored and a reference image obtaining section for obtaining the features of the reference image from an external apparatus communicably connected with the image processing apparatus; and a similarity calculation section for comparing the features of the input image data that are calculated by the features calculation section with the features of the reference image so as to calculate a similarity between the input image data and the reference image.

3. The image processing apparatus as set forth in claim 1, further comprising:

a storage section in which features of image data and identification information for identifying image data are stored; and a storage process section for causing the features of the input image data that are calculated by the features calculation section and identification information for identifying the input image data to be stored in the storage section in such a manner that the features are related to the identification information.

4. The image processing apparatus as set forth in claim 1, further comprising a pattern detection process section for determining whether the partial image includes an image pattern or not, the rotated image generating section generating the self-rotated image with respect to a partial image determined by the pattern detection process section as including an image pattern.

5. The image processing apparatus as set forth in claim 1, wherein the rotated image generating section generates a plurality of self-rotated images with respect to each partial image by rotating each partial image by different rotation angles, the matching test determination section determines whether the partial image matches each of the plurality of self-rotated images, and when the partial image matches at least one of the plurality of self-rotated images, the detection section detects, as each of the feature points, a target pixel in the partial image or a block made of a plurality of pixels including the target pixel.

6. The image processing apparatus as set forth in claim 1, wherein the partial image extraction section extracts plural kinds of partial images by differentiating a size of an area to be extracted as a partial image.

7. The image processing apparatus as set forth in claim 6, wherein the partial image extraction section performs a first extraction process for extracting a partial image while setting a size of an area to be extracted as the partial image to be a first size, and a second extraction process for extracting a partial image while setting a size of an area to be extracted as the partial image to be a second size larger than the first size, and in the second extraction process, the partial image is extracted after excluding the area with the first size from the area with the second size in such a manner that the area with the first size and the area with the second size center an identical target pixel.

8. The image processing apparatus as set forth in claim 1, wherein the partial image extraction section extracts a partial image with respect to each of a plurality of color components of input image data.

9. The image processing apparatus as set forth in claim 1, further comprising a smoothing process section for performing a smoothing process on input image data, the feature point detection section detecting the feature points from the input image data subjected to the smoothing process.

10. An image forming apparatus, comprising an image processing apparatus as set forth in claim 1 and an image output section for forming an image corresponding to input image data on a recording material.

11. An image processing system, comprising an image processing apparatus and a server communicably connected with the image processing apparatus, one of the image processing apparatus and the server including a feature point detection section for detecting feature points included in input image data and a features calculation section for calculating features of the input image data in accordance with relative positions of the feature points detected by the feature point detection section, or the feature point detection section and the features calculation section being divided into the image processing apparatus and the server, the feature point detection section including:

a partial image extraction section for extracting, from the input image data, a partial image made of a plurality of pixels including a target pixel, an index for indicating busyness of the partial image being not less than a predetermined threshold value;

a displaced image generating section for generating a self-rotated image by displacing at least a part of the partial image, which has been extracted by the partial image extraction section, with an other part of the partial image;

a matching test determination section for determining whether an image pattern included in the partial image matches an image pattern included in the self-rotated image or not, when the partial image is caused to overlap the self-rotated image; and a detection section for detecting, as each of the feature points, (a) a target pixel in the partial image including the image pattern determined by the matching test determination section as matching the image pattern included in the self-rotated image, or (b) a block made of a plurality of pixels including the target pixel.

12. An image processing method, comprising the steps of:

(I) detecting feature points included in input image data; and (II) calculating features of the input image data in accordance with relative positions of the feature points detected in the step (I), the step (I) including the substeps of:

(i) extracting, from the input image data, a partial image made of a plurality of pixels including a target pixel, an index for indicating busyness of the partial image being not less than a predetermined threshold value;

(ii) generating a self-rotated image by displacing at least a part of the partial image, which has been extracted, with an other part of the partial image;

(iii) determining whether an image pattern included in the partial image matches an image pattern included in the self-rotated image or not, when the partial image is caused to overlap the self-rotated image; and (iv) detecting, as each of the feature points, (a) a target pixel in the partial image including the image pattern determined in the substep (iii) as matching the image pattern included in the self-rotated image, or (b) a block made of a plurality of pixels including the target pixel.

13. A non-transitory computer-readable storage medium in which a program for causing an image processing apparatus to operate is stored, the image processing apparatus including:

a feature point detection section for detecting feature points included in input image data; and a features calculation section for calculating features of the input image data in accordance with relative positions of the feature points detected by the feature point detection section, the feature point detection section including:

a partial image extraction section for extracting, from the input image data, a partial image made of a plurality of pixels including a target pixel, an index for indicating busyness of the partial image being not less than a predetermined threshold value;

a displaced image generating section for generating a self-rotated image by displacing at least a part of the partial image, which has been extracted by the partial image extraction section, with an other part of the partial image;

a matching test determination section for determining whether an image pattern included in the partial image matches an image pattern included in the self-rotated image or not, when the partial image is caused to overlap the self-rotated image; and a detection section for detecting, as each of the feature points, (a) a target pixel in the partial image including the image pattern determined by the matching test determination section as matching the image pattern included in the self-rotated image, or (b) a block made of a plurality of pixels including the target pixel, the program causing a computer to function as the feature point detection section.

* * * * *